(12) United States Patent
Poe

(10) Patent No.: US 11,560,230 B2
(45) Date of Patent: Jan. 24, 2023

(54) REMOVABLE CARGO FLOOR SYSTEMS AND METHODS FOR CARGO AIRCRAFT

(71) Applicant: ZSM HOLDINGS LLC, Dover, DE (US)

(72) Inventor: Blake Poe, Longmont, CO (US)

(73) Assignee: ZSM Holdings LLC, Dover, DE (US)

( * ) Notice: Subject to any disclaimer, the term of this patent is extended or adjusted under 35 U.S.C. 154(b) by 0 days.

(21) Appl. No.: 17/465,790

(22) Filed: Sep. 2, 2021

(65) Prior Publication Data
US 2022/0289383 A1 Sep. 15, 2022

Related U.S. Application Data

(63) Continuation of application No. PCT/US2021/021793, filed on Mar. 10, 2021.

(51) Int. Cl.
*B64D 9/00* (2006.01)
(52) U.S. Cl.
CPC ................... *B64D 9/003* (2013.01)
(58) Field of Classification Search
CPC ........ B64D 9/003; B64D 13/00; B64D 47/00; B64C 1/06; B64C 1/18; B64C 1/20; B64C 1/22; B64C 39/00; B64C 9/00
See application file for complete search history.

(56) References Cited

U.S. PATENT DOCUMENTS

| | | | |
|---|---|---|---|
| 2,134,260 A | 10/1938 | Nickerson | |
| 2,388,380 A * | 11/1945 | Bathurst | B64C 1/22 220/1.5 |
| 2,625,118 A | 1/1953 | Lechner | |
| 2,858,774 A | 11/1958 | Batten | |
| 2,998,948 A | 9/1961 | Sisk | |
| 3,374,972 A | 3/1968 | Webb, Sr. | |
| 4,186,901 A * | 2/1980 | Shorey | B64C 1/22 14/71.3 |
| 4,349,302 A | 9/1982 | Ferguson | |
| 4,483,499 A * | 11/1984 | Fronk | A61G 3/0833 414/679 |

(Continued)

FOREIGN PATENT DOCUMENTS

| | | | | |
|---|---|---|---|---|
| GB | 2121758 B | * | 8/1985 | ............... B64D 9/00 |
| JP | 58209650 A | | 12/1983 | |

OTHER PUBLICATIONS

International Search Report and Written Opinion for Application No. PCT/US20/49787, dated Nov. 30, 2020 (20 pages).

(Continued)

*Primary Examiner* — Assres H Woldemaryam
(74) *Attorney, Agent, or Firm* — Barnes & Thornburg LLP

(57) ABSTRACT

Systems and methods for removeably adding a cargo bay floor to the interior cargo bay of cargo aircraft bay are disclosed. The system includes a rail disposed in a cargo bay of a cargo aircraft with the rail extending longitudinally along both a length of a forward portion and an aft portion of the fuselage. The system includes a cargo floor segment configured to be removeably attached to the rail. When attached, the cargo floor segment can transform between a first arrangement with the cargo floor segment translatable along the rail, and a second arrangement with the cargo floor segment fixedly secured to a location along the rail. The cargo floor segment is configured to, when secured to the rail, define a section of a floor of the cargo bay of the cargo aircraft. Multiple floor segments can be used together to form a continuous floor for the aircraft.

42 Claims, 32 Drawing Sheets

(56) References Cited

U.S. PATENT DOCUMENTS

| | | | |
|---|---|---|---|
| 7,100,231 B2* | 9/2006 | Peschmann | B65G 69/30 |
| | | | 414/537 |
| 8,121,786 B2 | 2/2012 | Morbey et al. | |
| 10,994,842 B1* | 5/2021 | Skylus | B64C 30/00 |
| 2002/0074456 A1* | 6/2002 | Marrero | B64F 1/324 |
| | | | 244/137.1 |
| 2004/0200930 A1 | 10/2004 | Bays-Muchmore et al. | |
| 2007/0025832 A1* | 2/2007 | Rawdon | B64D 9/00 |
| | | | 414/401 |
| 2009/0173824 A1 | 7/2009 | Perez-Sanchez | |
| 2010/0252682 A1 | 10/2010 | Pahl | |
| 2015/0183519 A1 | 7/2015 | Llamas Sandin | |
| 2016/0101947 A1* | 4/2016 | Himmelmann | B64C 1/20 |
| | | | 406/88 |
| 2016/0311512 A1 | 10/2016 | Sankrithi | |
| 2017/0106966 A1* | 4/2017 | Himmelmann | B64C 1/20 |
| 2020/0047869 A1 | 2/2020 | Meiranke et al. | |
| 2020/0207475 A1* | 7/2020 | Dobberfuhl | B65G 67/00 |

OTHER PUBLICATIONS

International Search Report and Written Opinion for Application No. PCT/US2021/021792, dated May 20, 2021 (12 Pages).

International Search Report and Written Opinion for Application No. PCT/US2021/021793, dated May 27, 2021 (20 Pages).

No Author Listed. "747-400/-400ER Freighters" StartupBoeing. May 2010.

No Author Listed. Antonov Airlines Brochure. Jul. 2019. [online] retrieved from <URL: https://www.antonov-airlines.com/wp-content/uploads/2019/07 /Antonov-Airlnes- brochure.pdf>.

No Author Listed. C-130J Super Hercules Brochure, Lockheed Martin.

No Author Listed. DHC-4 A Caribou Brochure, The De Havilland Canada. Nov. 1962.

No Author Listed. Piasecki H-21 Helicopter, Wikipedia. Website. Accessed Oct. 29, 2021. url: <https://en.wikipedia.org/wiki/Piasecki_H-21>.

* cited by examiner

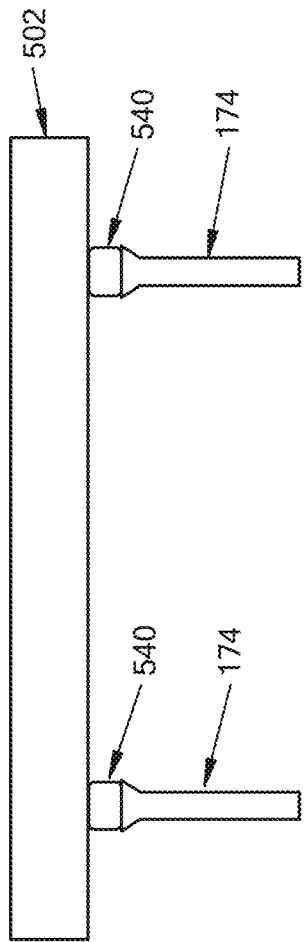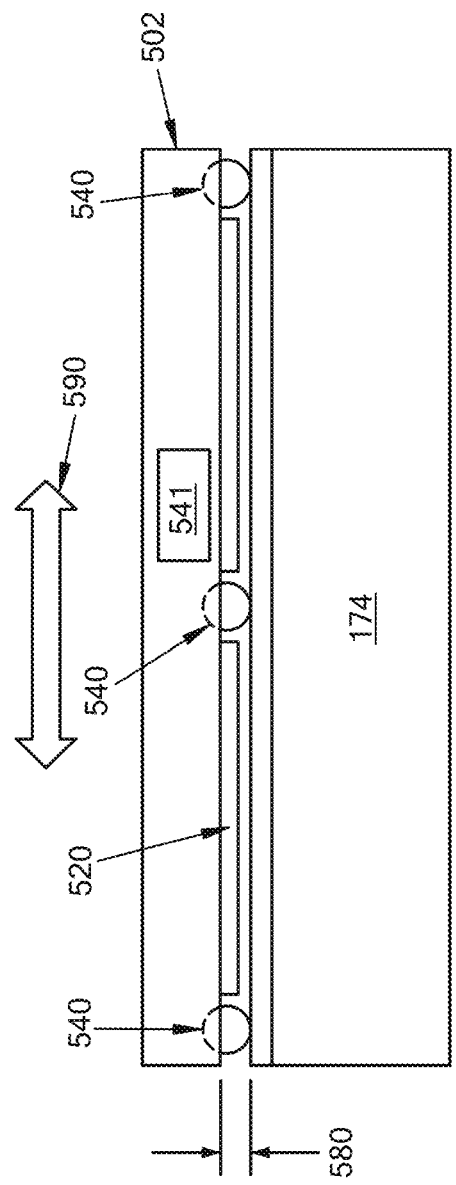

REMOVABLE CARGO FLOOR SYSTEMS AND METHODS FOR CARGO AIRCRAFT

CROSS-REFERENCE TO RELATED APPLICATIONS

This application is a U.S. national stage filing from International Application Number PCT/US2021/021793, filed Mar. 10, 2021, the contents of which is incorporated by reference herein in its entirety.

FIELD

The present disclosure relates to modular cargo floor systems for cargo aircraft, and more particularly to designs that allow for, or include, removable and replaceable cargo floor segments that create a cargo floor in a cargo aircraft. The segments can attach to a rail system in the cargo bay, advance to a desired position, and be secured in place to form a fixed segment of a cargo bay floor. Multiple segments can be attached together to create a cargo bay floor of a desired size that can extend along a substantial length, up to the entire length, of the rail system.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Existing cargo aircraft, including some of the largest aircraft ever to fly, are not able to transport extremely largo cargo, even if that cargo is, in all dimensions, smaller than the aircraft itself. This limitation is often the result of cargo aircraft, even those purpose-built to be cargo aircraft, not fully utilizing their overall size as cargo bay volume. This constraint has many causes, one of which is related to the ability of the aircraft to takeoff and land without excessive runway length. Larger and heavier aircraft take more energy to accelerate during takeoff, as well are more energy to decelerate upon landing. Accordingly, traditional solutions involve increasing the lift provided by the aircraft's lifting surfaces to allow the aircraft to get off the ground at a slower speed and, conversely, to allow the aircraft to approach the runway at a slower speed (while still being able to abort and climb, if necessary). A person skilled in the art will recognize other challenges that exist when trying to maximize an amount cargo bay volume being used and will likewise appreciate that often it may not even be desirable to maximize cargo bay volume usage.

Cargo aircraft that are designed to carry significantly oversized payloads generally have cargo bay arrangements (e.g., size, shape, installed hardware) specifically tailored to load and secure the oversized payloads, which can result in designs that forgo a traditional flat cargo bay floor in favor of more efficient use of the available cargo bay volume. However, the lack of a traditional flat cargo bay floor can significantly limit a cargo aircraft's ability to carry more traditional payloads that would otherwise be loaded into a traditional floored cargo bay by being rolled using external devices (e.g., a forklift) into the cargo bay and subsequently secured to the floor using traditional methods, such as nets or tie-downs. Further, the lack of a traditional flat cargo bay floor can make it more difficult for humans and machines to navigate around in the cargo bay because of the lack of an expansive, flat floor.

Accordingly, there is a need to develop cargo floors that have the versatility to be used in conjunction with wide varieties of cargo payloads while still providing the benefits of more traditional flat floors.

SUMMARY

Certain examples of the present disclosure include a system that includes a cargo aircraft having at least one rail (at least sometimes referred to in this Summary section, and in other sections of the disclosure, as a rail, although it can be more than one rail) disposed in an interior cargo bay of the cargo aircraft. The interior cargo bay has a forward bay portion located in a forward end of the cargo aircraft, an aft bay portion located in an aft end of the cargo aircraft, and the rail extending longitudinally along a length of the forward bay portion and a length of the aft bay portion. The system also includes at least one cargo floor segment (at least sometimes referred to in this Summary section, and in other sections of the disclosure, as a cargo floor segment, although it can be multiple segments). The cargo floor segment is configured to be removeably attached to the rail, and, when attached to the rail, the cargo floor segment is transformable between a first arrangement in which the cargo floor segment is translatable along a length of the rail, and a second arrangement in which the cargo floor segment is fixedly secured with respect to a location along the length of the rail. Additionally, the cargo floor segment is configured to, when fixedly secured with respect to a location along the length of the rail, define a section of a floor of the cargo bay of the cargo aircraft.

In some exemplary embodiments the at least one cargo floor segment can include a plurality of cargo floor segments, with each segment of the plurality of cargo floor segments being configured to be removably attached to the rail, adjacent to another cargo floor segment of the plurality of cargo floor segments. Further, each segment can be fixedly secured with respect to a location along the length of the rail in adjacent locations to define a continuous section of the floor of the cargo bay. Each of the plurality of cargo floor segments can be configured to be attached to the adjacent cargo floor segment of the plurality of cargo floor segments. In at least some instances, the cargo floor segment includes an interface region that spans along at least a portion of a length of the cargo floor segment. The interface region can be configured to contact the rail in the second arrangement and a translator can be configured to contact the rail in the first arrangement, thereby enabling translation of the cargo floor segment along the rail. The translator can be, for example, one or more wheels and/or sliders. The translator can be configured to removably attach the cargo floor segment to the rail. The interface region of the cargo floor segment, in the first arrangement, can be spaced apart from the rail and configured to be advanced, in the second arrangement, along the rail.

The system can include a transition mechanism configured to switch the cargo floor segment between the first arrangement and the second arrangement and, in at least some instances, the transition mechanism can be carried by or integrated with the cargo floor segment. The transition mechanism can be configured to raise and lower the interface region with respect to the rail, and the transition mechanism can be configured to raise and lower the interface region by raising and lowering the cargo floor segment. In some embodiments, the transition mechanism and the translator are operatively coupled together such that the transition mechanism raises and lowers the cargo floor segment by applying a force to the rail via the translator.

Embodiments of the system can include the cargo floor segment having a fixation mechanism configured to fixedly secure the cargo floor segment with respect to the location along the length of the rail by creating a geometric interference between the cargo floor segment and at least one of the rail or other structural element(s) of the cargo aircraft. The geometric interference can be configured to prevent movement of the cargo floor segment with respect to the rail.

The fixation mechanism can include a locking body configured to pass through an opening associated with the rail or the other structural element of the cargo aircraft to create the geometric interference. A geometric interference can be an arrangement between one component whereby neither component can move in one or more directions with respect to the other component without materially deforming or destroying itself and/or the other component.

In some embodiments, the at least one rail includes a first rail and a second rail extending substantially parallel to each other along a length of the cargo bay that includes the length of the forward bay portion and the length of the aft bay portion.

The cargo floor segment can include a fixed region and at least one lateral end segment rotatably coupled to the fixed region. Additionally, or alternatively, the cargo floor segment can be configured to be securely fixed at one or more predetermined locations along the rail, and the cargo floor segment can define lateral ends sized and shaped to correspond to an inner surface of the cargo bay at the one or more predetermined locations.

In some embodiments, the system includes a cargo nose door configured to open a portion of the forward end of the cargo aircraft such that a terminal end of the rail disposed in the forward bay portion is accessible from an outside environment when the cargo nose door is open. The cargo floor segment can be configured to be at least partially attached to the terminal end of the rail when the cargo nose door is open and loaded into the cargo bay such that, after being loaded, the cargo floor segment is completely attached to the rail. The cargo floor segment can be configured to support cargo weight and direct at least a majority of the cargo weight supported by the cargo floor segment into the rail. In some embodiments, the cargo floor segment can include one or more lateral support beams configured to direct payload loads at lateral ends of the cargo floor segment to the rail, for instance via a medially located interface region configured to contact the rail in the second arrangement.

In at least some embodiments, the cargo aircraft includes a kinked bay portion disposed between the forward bay portion and the aft bay portion. The kinked bay portion can define a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft. In some such embodiments, the rail can extend from the forward bay portion, through the kinked bay portion, and into the aft bay portion.

The at least one cargo floor segment can include a plurality of cargo floor segments, each segment of the plurality of cargo floor segments configured to be removably attached to the rail, adjacent to another cargo floor segment of the plurality of cargo floor segments. Each segment can also be fixedly secured with respect to a location along a length of the rail in adjacent locations to define a continuous section of the floor of the cargo bay that extends from the forward bay portion, through the kinked bay portion, and into the aft bay portion. In some such embodiments, the continuous section of the floor defines an aft region in the aft bay portion that extends above a forward region in the forward bay portion. In some embodiments, the rail includes a kinked portion such that a vertical distance between at least a portion of the rail aft of the kinked portion and the plane defined by an interior bottom contact surface of the forward bay portion is greater than a vertical distance between at least a portion of the rail forward of the kinked portion and the plane defined by the interior bottom contact surface of the forward bay portion.

In at least some embodiments, the kinked portion of the rail is disposed in the aft bay portion such that a majority of the kinked portion forms an angle with a portion of the rail disposed in the forward bay portion that is substantially parallel to the longitudinal-lateral plane of the cargo aircraft. The rail can extend continuously along an interior bottom contact surface of the cargo bay from the forward bay portion to the aft bay portion. In some embodiments, the rail can further serve as a primary structural beam of the cargo aircraft. In at least some instances, the rail can include at least two rails disposed approximately parallel to each other.

The system can further include a ground-based cargo loading structure. The ground-based cargo loading structure can include at least one rail having a terminal end configured to be positioned adjacent to a terminal end of the at least one rail in the cargo bay of the aircraft when the terminal end of the at least one rail in the cargo bay of the aircraft is exposed via an opening of a cargo bay door. Further, the cargo floor segment can be configured to be translated between the cargo aircraft and the ground-based cargo loading structure via the rail when the terminal ends of the respective rails of the cargo load structure and the cargo aircraft are positioned adjacent to each other. The cargo floor segment can also be configured to be loaded with at least a portion of a payload while attached to the rail of the ground-based cargo loading structure and can subsequently assist in the loading of the payload into the cargo bay. This can be accomplished, for example, by the cargo floor segment(s) being translated along the rails from ground-based cargo loading structure and into the cargo bay. In some instances, the cargo floor segment can include one or more fixtures configured to secure at least a portion of a payload to the cargo floor segment.

Another exemplary embodiment of the present disclosure is a method of loading a cargo floor onto a cargo aircraft that includes removably attaching at least one cargo floor segment (again, at least sometimes referred to in this Summary section, and in other sections of the disclosure, as a cargo floor segment, although it can be multiple segments) to one or more rails (likewise, again, at least sometimes referred to in this Summary section, and in other sections of the disclosure, as a rail, although it can be more than one rail) disposed in an interior cargo bay of a cargo aircraft. The interior cargo bay has a forward bay portion located in a forward end of the cargo aircraft, an aft bay portion located in an aft end of the cargo aircraft, and the rail extends longitudinally along a length of the forward bay portion and a length of the aft bay portion. The method further includes translating the cargo floor segment along the rail through at least a portion of the interior cargo bay to a desired location along a length of the rail, and fixedly securing the cargo floor segment at the desired location to define a section of a cargo floor of the cargo bay of the cargo aircraft.

In at least some instances, the cargo floor segment includes a plurality of cargo floor segments. In such instances, the method can further include sequentially attaching the plurality of cargo floor segments to the rail and translating each cargo floor segment of the plurality of cargo floor segments to respective desired locations. Each desired location can be a corresponding adjacent location to each other. The method can further include fixedly securing each cargo floor segment of the plurality of cargo floor segments at the respective desired locations to define a continuous section of the cargo floor of the cargo bay.

The method can further include attaching each cargo floor segment of the plurality of cargo floor segments to an adjacent cargo floor segment of the plurality of cargo floor segments. The action of fixedly securing the cargo floor segment can include contacting the rail with an interface region of the cargo floor segment. In such instances, the interface region can span along at least a portion of a length of the cargo floor segment. In some such embodiments, the interface region can be spaced apart from the rail when the action of translating the cargo floor segment along the rail occurs. In some instances, the action of removably attaching the cargo floor segment to the rail can include coupling a translator of the cargo floor segment to the rail. The translator can enable the cargo floor segment to be advanced along the rail. The action of fixedly securing the cargo floor segment can include raising or lowering the interface region with respect to the rail. In some embodiments, a transition mechanism of the cargo floor segment can switch the cargo floor segment between a first arrangement in which the cargo floor segment can be advanced along the rail and a second arrangement in which movement of the cargo floor segment along the rail can be resisted by the interface region. In some embodiments, the transition mechanism and the translator can be operatively coupled together, and the action of fixedly securing the cargo floor segment at the desired location can further include applying a force to the rail via the translator.

In some embodiments, fixedly securing the cargo floor segment further includes creating a geometric interference between the cargo floor segment and the rail or other structural element(s) of the cargo aircraft. For example, creating the geometric interference can include disposing a locking body coupled to the cargo floor segment through an opening associated with the rail or the other structural element(s) of the cargo aircraft.

In some embodiments, removably attaching a cargo floor segment to a rail disposed in an interior cargo bay of a cargo aircraft includes translating the cargo floor segment from one or more rails of a ground-based cargo loading structure onto the rail(s) of the cargo aircraft when a terminal end of the rail(s) of the ground support structure is adjacent to a terminal end of the rail(s) of the cargo aircraft. In some embodiments, a payload to be loaded onto the cargo aircraft can be securely fixed to the cargo floor segment before the cargo floor segment is advanced from the ground-based cargo loading structure into the cargo bay of the cargo aircraft. In some such instances, after the payload and the cargo floor segment are loaded into the cargo bay, the method can further include securing the payload at the location in the cargo bay by fixedly securing the cargo floor segment at the desired location.

The method can further include rotating one or more lateral end segments of the cargo floor segment with respect to a fixed region of the cargo floor segment.

In some embodiments, the rail includes a kinked portion such that a vertical distance between at least a portion of the rail aft of the kinked portion and the plane defined by an interior bottom contact surface of the forward bay portion is greater than a vertical distance between at least a portion of the rail forward of the kinked portion and the plane defined by the interior bottom contact surface of the forward bay portion. The kinked portion of rail can be disposed in the aft bay portion such that a majority of the kinked portion forms an angle with a portion of the rail disposed in the forward bay portion that is substantially parallel to the longitudinal-lateral plane of the cargo aircraft. The rail can extend continuously along an interior bottom contact surface of the cargo bay from the forward bay portion to the aft bay portion. In some embodiments, the rail can further serve as a primary structural beam of the cargo aircraft. The rail can include at least two rails disposed approximately parallel to each other.

BRIEF DESCRIPTION OF DRAWINGS

This disclosure will be more fully understood from the following detailed description taken in conjunction with the accompanying drawings, in which:

FIG. 11A is a schematic front view of the cargo bay floor segment of FIGS. 6C-6G in a translation arrangement with the rails of the cargo aircraft;

FIG. 11B is a schematic side view of the cargo bay floor segment and rails of FIG. 11A with wheels associated with the cargo bay floor segment in a translation arrangement;

DETAILED DESCRIPTION

Figure 1A:
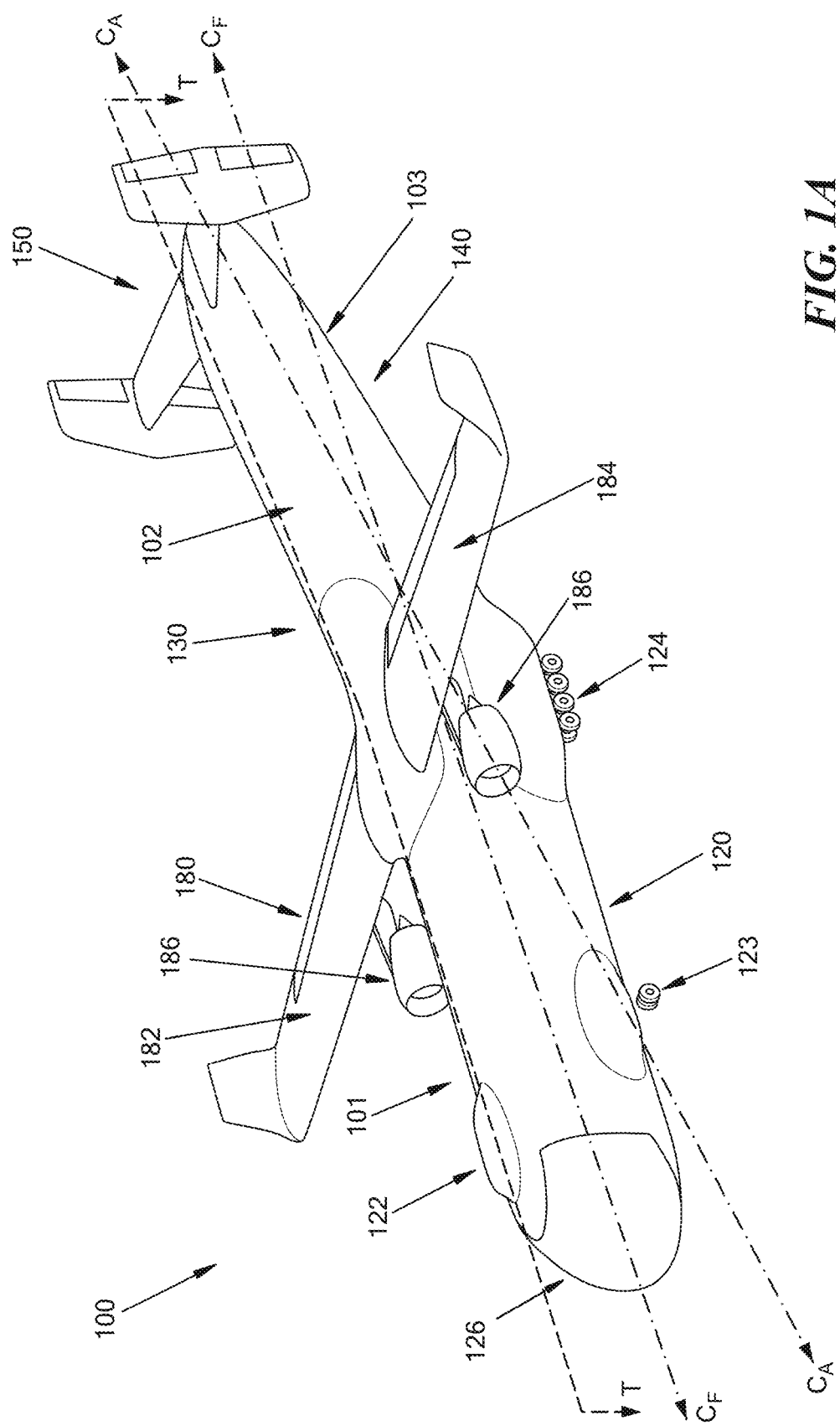
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting embodiments and that the scope of the present disclosure is defined solely by the claims. The features illustrated or described in connection with one embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not be to scale or may be somewhat crude renderings of the disclosed components. A person skilled in the art will understand how to implement these teachings and incorporate them into working systems, methods, aircraft, and components related to each of the same, as provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present disclosure is related to large, transport-category aircraft capable of moving oversized cargo not traditionally shippable by air. For example, wind turbine blades, which are typically highly elongated and irregular in shape to provide greater electrical power generating efficiency, or similarly long industrial equipment, shipping containers, or military equipment. The present disclosure is not limited to these specific cargos or payloads, but rather, these are examples. Examples of the present disclosure include aircraft with cargo rails extending along the lower surface of a cargo bay and a plurality of cargo floor segments configured to be removably attached to cargo rails, advanced into a desired positioned in the cargo bay along the rails, and secured into position to form a fixed cargo bay floor segment. A plurality of the cargo floor segments can be secured into different positions to form a flat cargo bay floor that extends along some or all of the length of the cargo bay. Examples of installed configurations include a flat cargo bay floor that extends from a forward or aft cargo opening into the cargo bay and extends therefrom along some, a majority, or up to nearly all or all of the length of the cargo bay into the aircraft. Examples include removable cargo bay floor segments that can geometrically lock with structural elements of the cargo aircraft such that, once the removable cargo bay floor segments are moved into a desired position, they can be fixedly secured in place and unable to move in any direction, thereby allowing any cargo subsequently secured to the removable cargo bay floor segments to be effectively directly secured to the cargo aircraft.

Embodiments include removable cargo bay floor segments that can be sized and shaped to span most or all of the available width of the lower cargo bay when in a desired position. Embodiments also include removable cargo bay floor segments that can interlock with adjacent removable cargo bay floor segments to, for example, be advanced together into the cargo bay. Embodiments of the present disclosure include aircraft configured to receive the removable cargo bay floor segments, which can each provide, for example, a removable flat floor along some, a majority, or up to nearly all or all of the length of the aircraft's interior cargo bay. Embodiments include removable cargo bay floor segments of different sizes and lengths, which can be selectively attached to a lower rail system extending longitudinally into the cargo bay of an aircraft based on the dimensions of a payload to be carried in the aircraft. Embodiments also include removable cargo bay floor segments that enable selecting a desired length of a cargo bay floor extension to an aircraft's cargo bay by selecting how many individual removable cargo bay floor segments sections are coupled to the aircraft's cargo rail system and advanced into position. Each removable cargo bay floor segment can provide a segment of a resultant continuous interior cargo bay floor that spans the length of all of the removable cargo bay floor segments disposed in the interior cargo bay, and onto which all sorts of payloads, including one or more traditional and/or non-traditional cargo payloads, can be loaded and secured for travel.

Embodiments include designs for removable cargo bay floor segments that can be configured to, in a first mode or configuration, be easily advanced along a cargo bay rail system into the cargo bay using, for example, a plurality of wheels arranged on the underside of the removable cargo bay floor segments. Such removable cargo bay floor segments can also be configured to, in a second mode, be secured in place after being advanced into the cargo bay by directly coupling with the cargo rail system using, for example, a locking pin or other geometric interface that prevents any significant or meaningful movement of the removable cargo bay floor segment with respect to the cargo bay rail system once coupled. Embodiments also include removable cargo bay floor segments that have interface regions configured to contact the cargo bay rail system in the second mode (e.g., an elongated channel disposed on the underside of a removable cargo bay floor segment and shaped to be rest along a length of one rail) to more evenly distribute the weight of the removable cargo bay floor segments, and any cargo payloads secured thereto, along the cargo bay rail system.

Aircraft

Figure 1B:
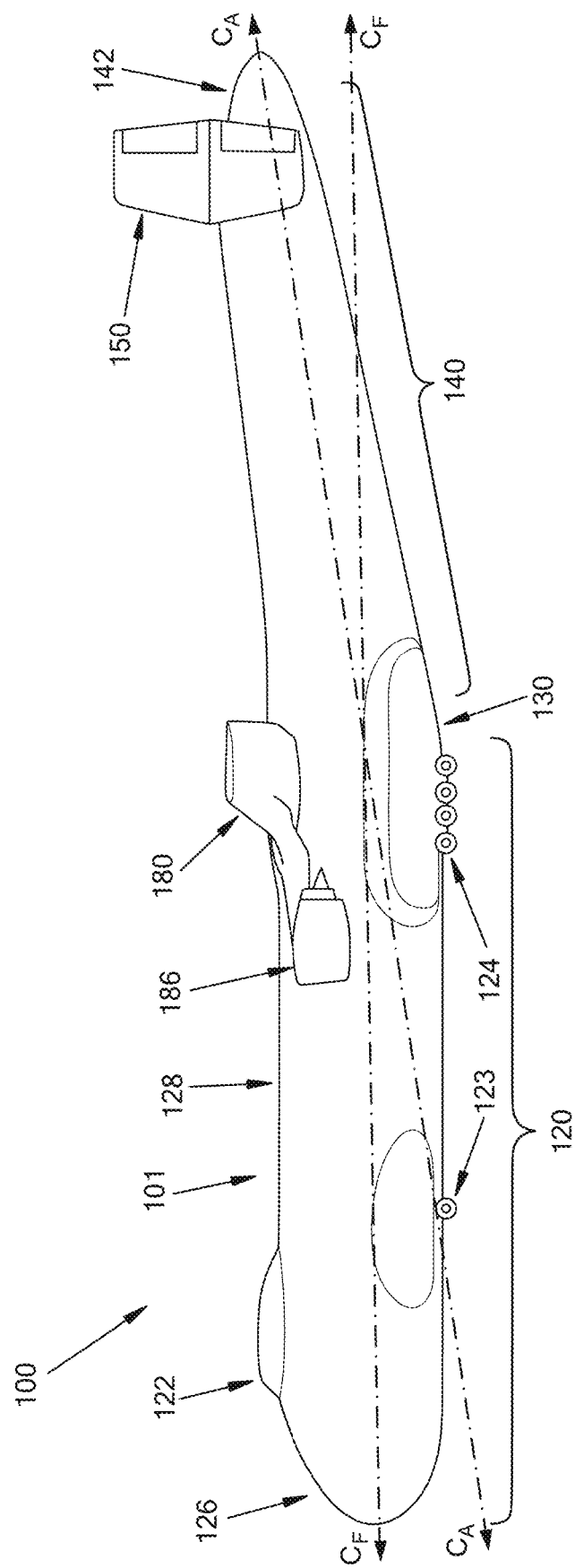
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D, 6B-6D, and 8A. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload-large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, for example in FIGS. 1A-1B and 2A-2D, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 100 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline $C_A$ of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to as the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tail cone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101. In other embodiments, a nose cone door can swing in other manners, such as being hinged on a left or right side to swing clockwise or counter-clockwise towards the fixed portion 128 of the fuselage. The fixed portion 128 of the forward fuselage 101 is the portion that is not the nose cone 126, and thus the forward fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tail cone 142. While loading through an aft door is possible with the present disclosures, doing so would make loading into and use of the interior cargo bay 170 space in the aft end 140 all the way into the fuselage tail cone 142 much more challenging and difficult to accomplish-a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A bottom contact surface 172 (sometimes referred to as a floor, although not the same floor as the removable floor and its segments provided for herein) can be located in the interior cargo bay 170, and can also extend in a continuous manner, much like the bay 170 itself, from the forward end 120, through the kinked portion 130, and into the aft end 140. The bottom contact surface 172 can thus be configured to have a forward end 172$f$, a kinked portion 172$k$, and an aft end 172$a$. In some embodiments, the bottom contact surface 172 can be configured in a manner akin to most bottom contact surfaces of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 4A-4C.

Opening the nose cone 126 not only exposes the cargo opening 171 and the bottom contact surface 172, but it also provides access from an outside environment to a cantilevered tongue 160 that extends from or otherwise defines a forward-most portion of the fixed portion 128 of the fuselage 101. The cantilevered tongue can be an extension of the bottom contact surface 172, or it can be its own feature that extends from below or above the bottom contact surface 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tail cone 142, can be used to receive cargo as part of the continuous interior cargo bay 170. Proximate to the fuselage tail cone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tail cone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tail cone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other commonly-owned patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
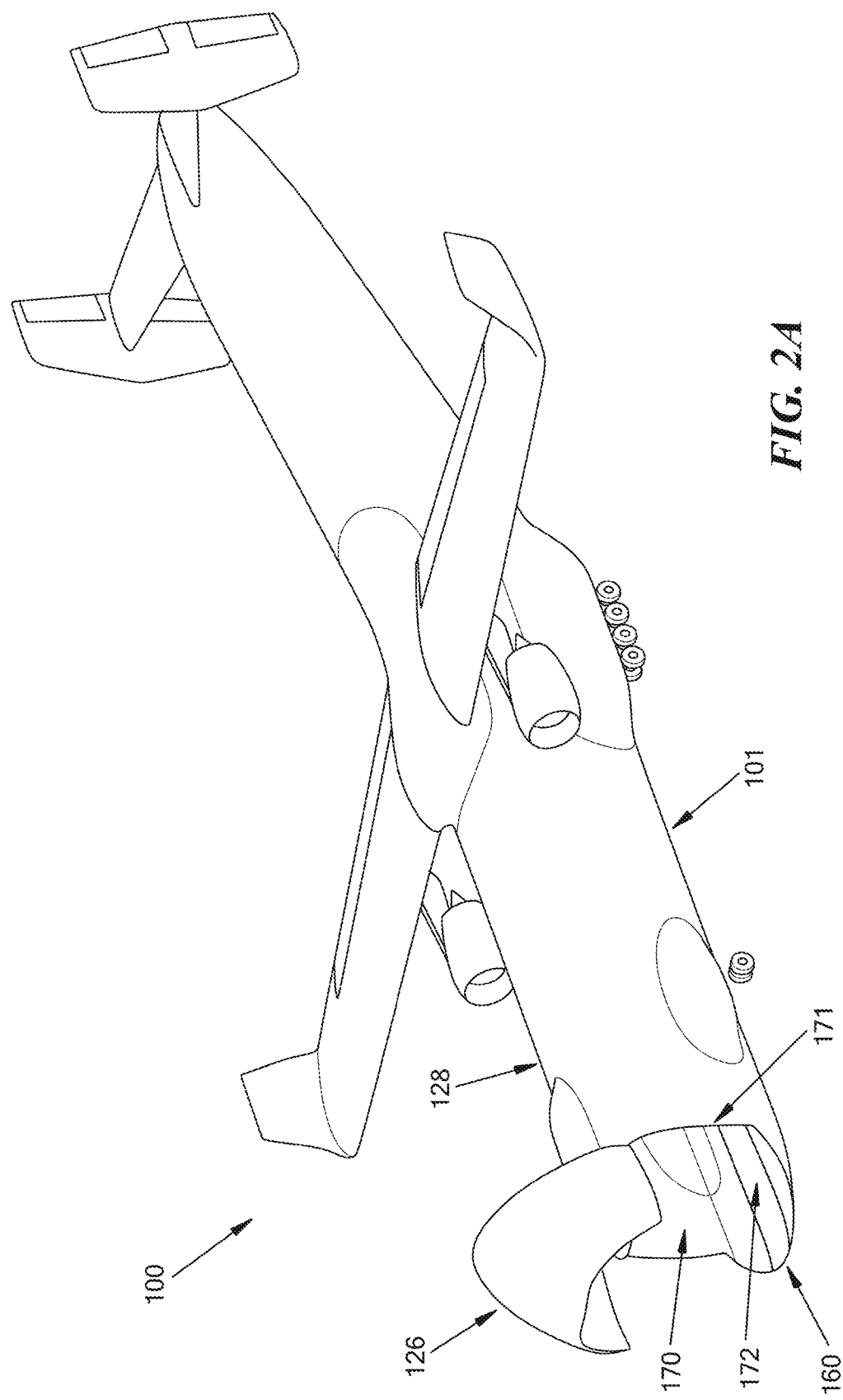
FIG. 2A is an isometric view of the aircraft of FIG. 1A with a nose cone door in an open position to provide access to an interior cargo bay of the aircraft.
Figure 2B:
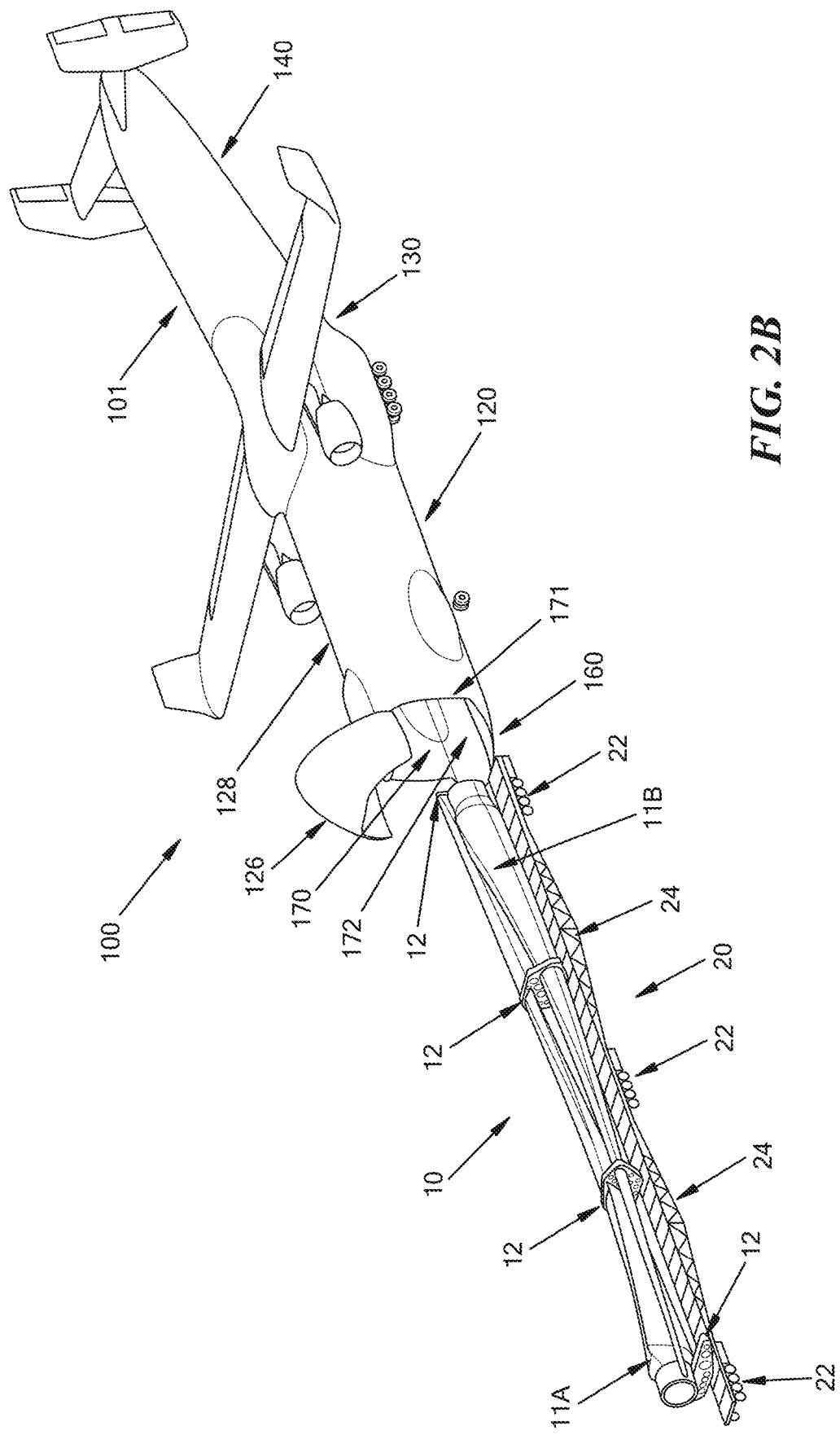
FIG. 2B is an isometric view of the aircraft of FIG. 2A with a payload being disposed proximate to the aircraft for loading into the interior cargo bay.
Figure 2C:
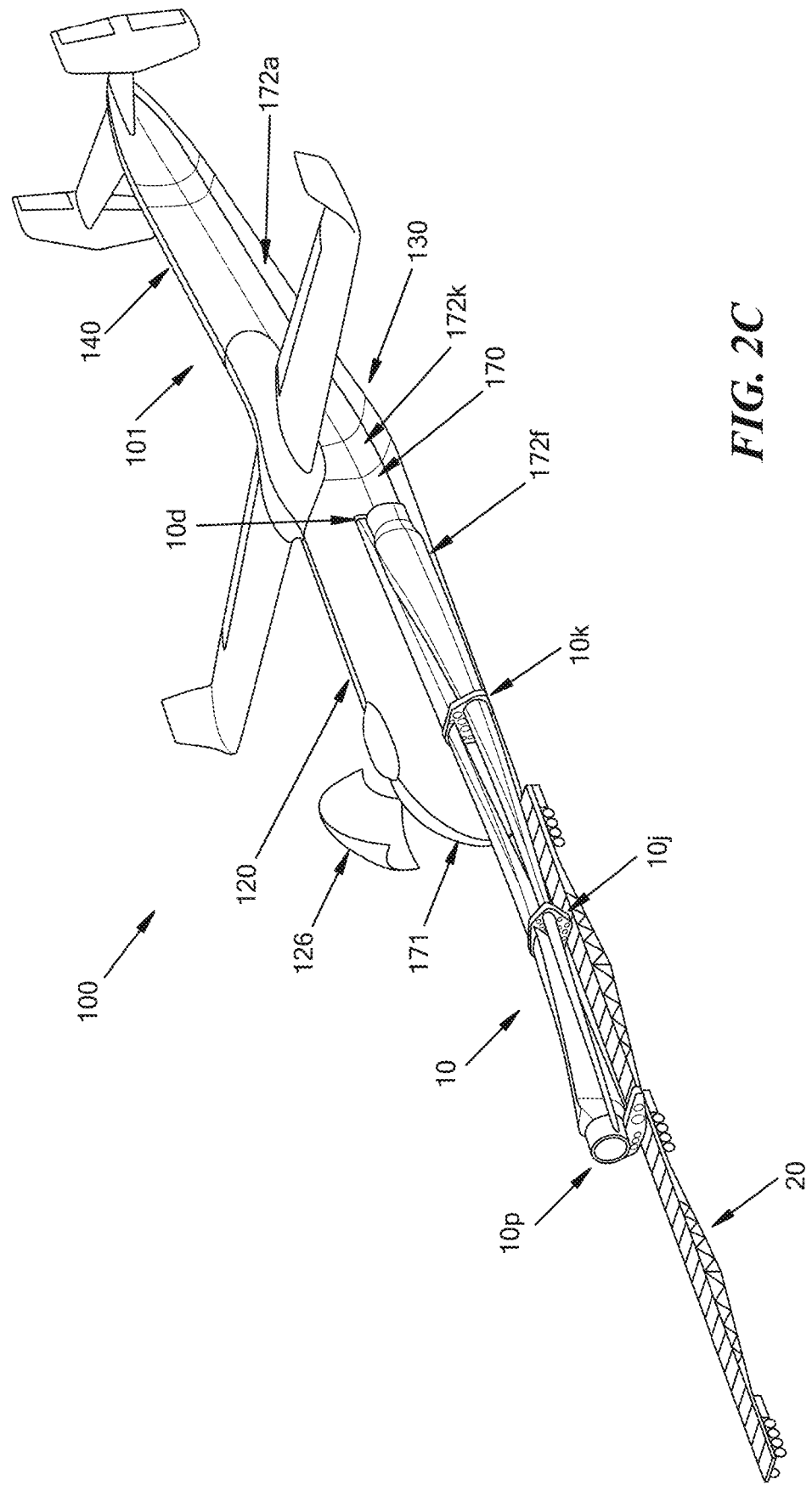
FIG. 2C is an isometric, partial cross-sectional view of the aircraft of FIG. 2B with the payload being partially loaded into the interior cargo bay.
Figure 2D:
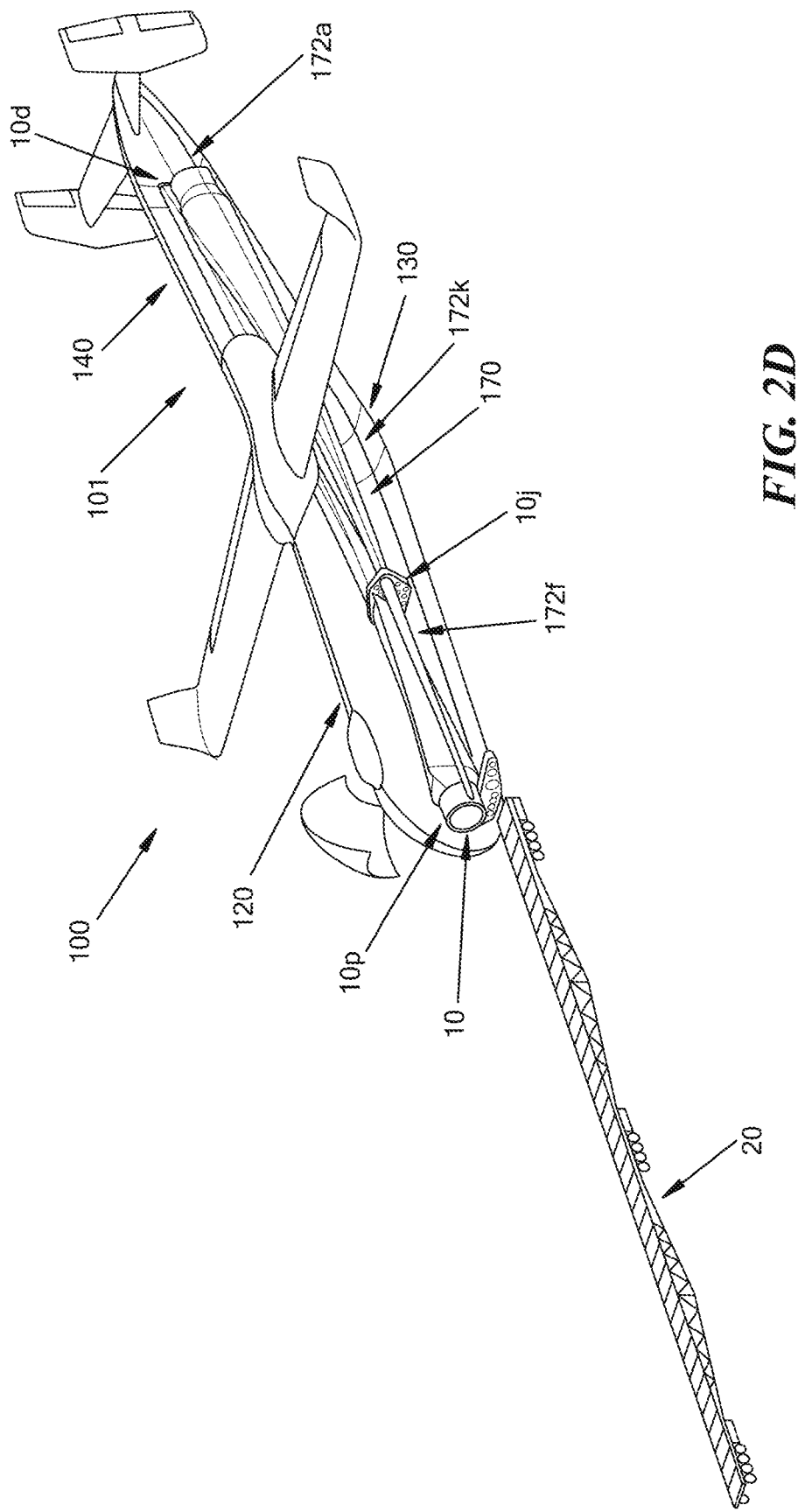
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10d of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10d of the payload 10d is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10p, 10d extends from the forward end 120, through the kinked portion 130, and into the aft end 140. As shown, the only contact points with a floor of the interior cargo bay 170 (which for these purposes includes the tongue 160) are at the proximal and distal ends 10p, 10d of the payload 10 and at two intermediate points 10j, 10k between the proximal and distal ends 10p, 10d, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in commonly-owned applications, or otherwise known to those skilled in the art.

Figure 3A:
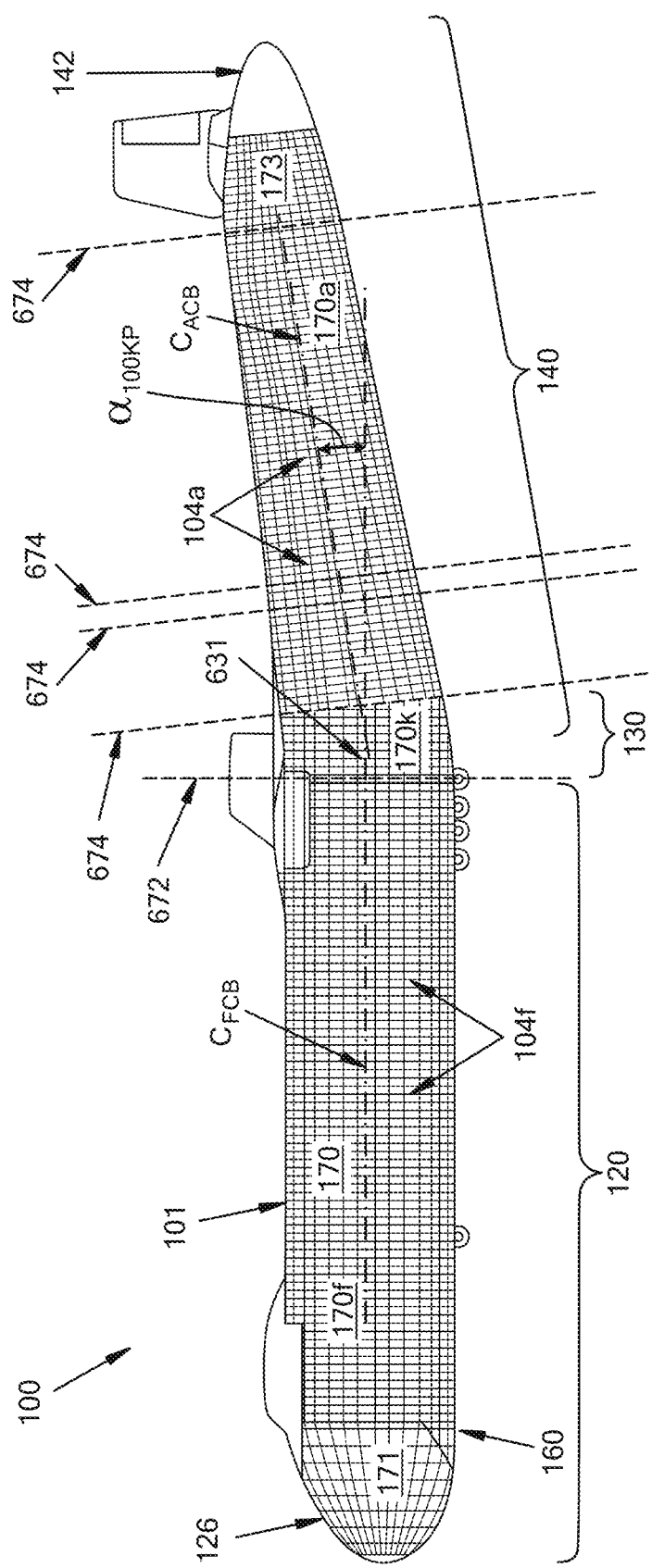
FIG. 3A is a side cross-sectional view of the aircraft of FIG. 1A, including an interior cargo bay of the aircraft.

FIG. 3A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 is forward or aft of a fuselage kink such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuselage while increasing the maximum straight-line payload length for a given overall aircraft length and tailstrike angle, as shown at least in FIG. 3B.

Figure 3B:
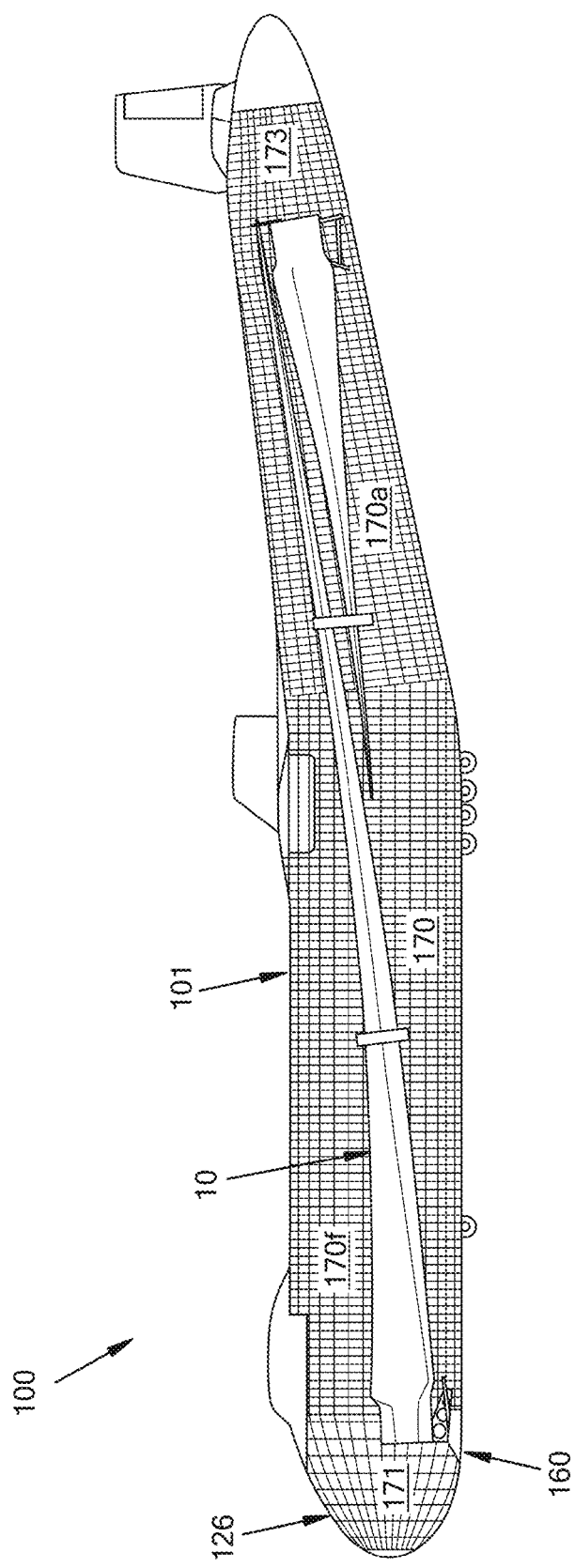
FIG. 3B is the side cross-sectional view of the aircraft of FIG. 3A with an exemplary payload disposed in the interior cargo bay.

FIG. 3B shows a side cross-sectional view of the fuselage 101 of the cargo aircraft 100 of FIG. 1A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Figure 3C:
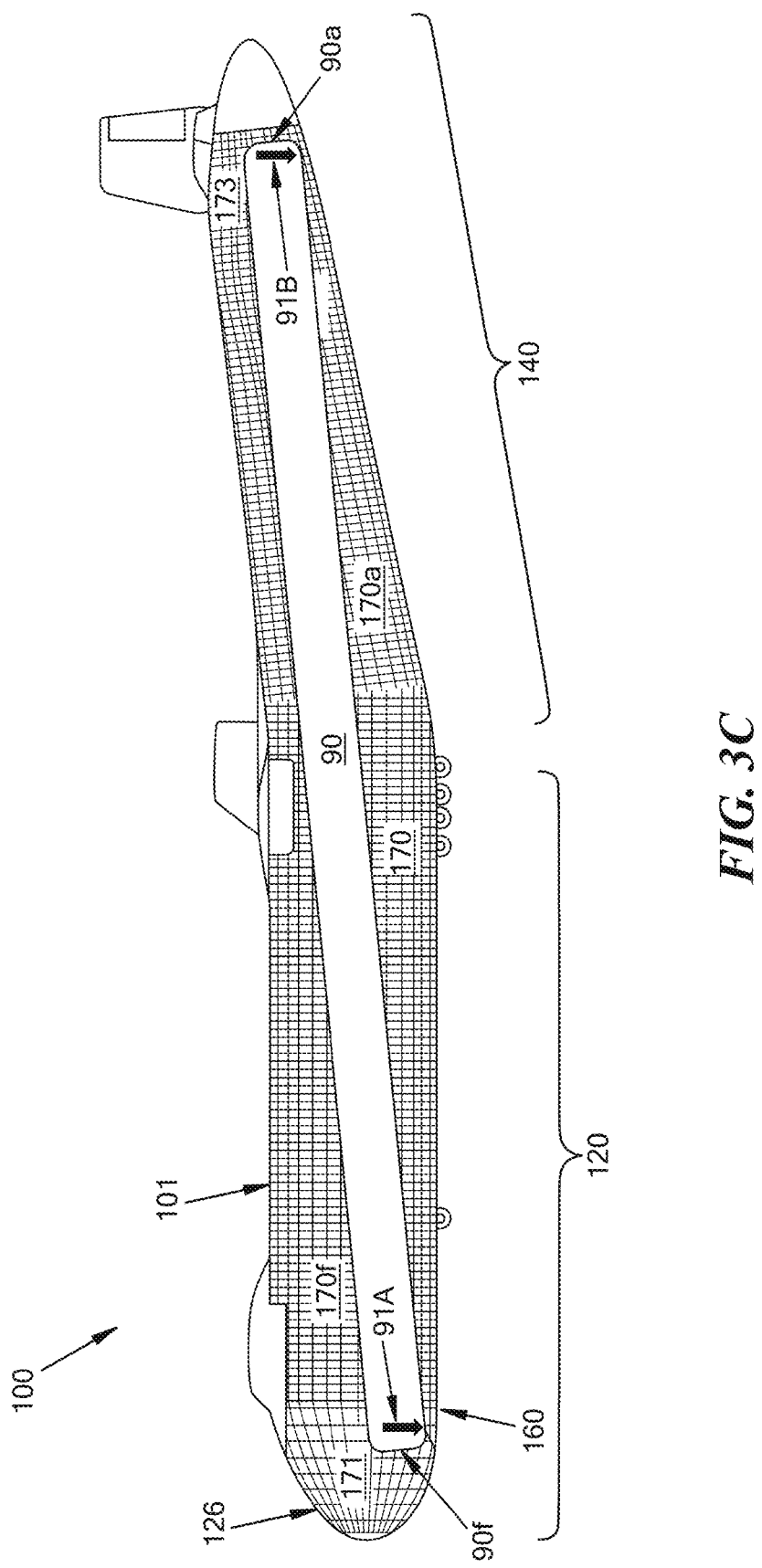
FIG. 3C is the side cross-sectional view of the aircraft of FIG. 3A with a schematic of an exemplary maximum-length payload disposed in the interior cargo bay.

FIG. 3C is the same cross-sectional view of the fuselage 101 of the cargo aircraft 100 of FIG. 3B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Additional details about a kinked fuselage configuration are provided in International Patent Application No. PCT/US2020/049787, entitled "AIRCRAFT FUSELAGE CONFIGURATIONS FOR AVOIDING TAIL STRIKE WHILE ALLOWING LONG PAYLOADS," and filed Sep. 8, 2020, and the content of which is incorporated by reference herein in its entirety.

Rails and Payload-Receiving Fixtures

Figure 4A:
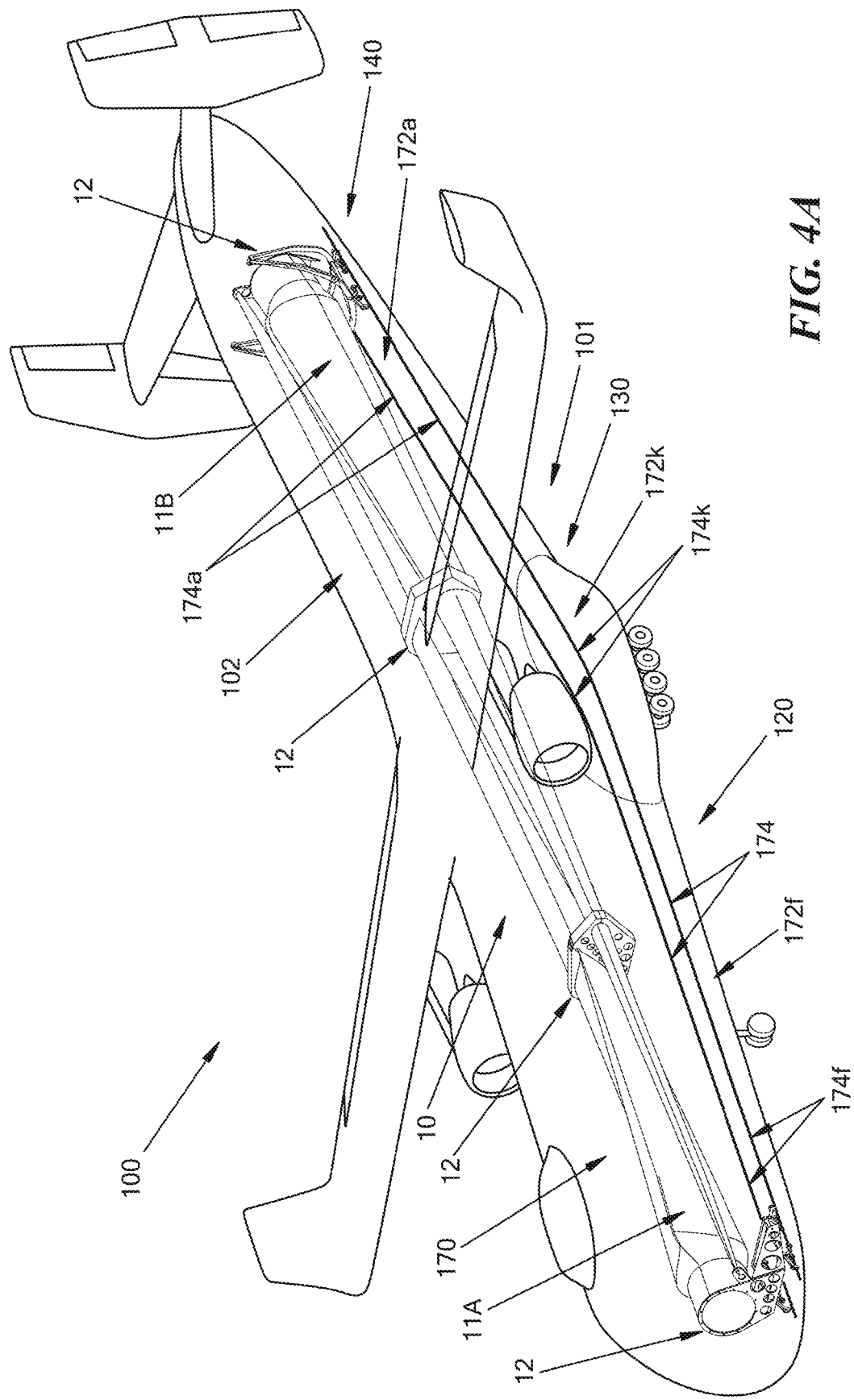
FIG. 4A is an isometric, transparent view of the aircraft of FIG. 1A having a payload disposed therein.
Figure 4B:
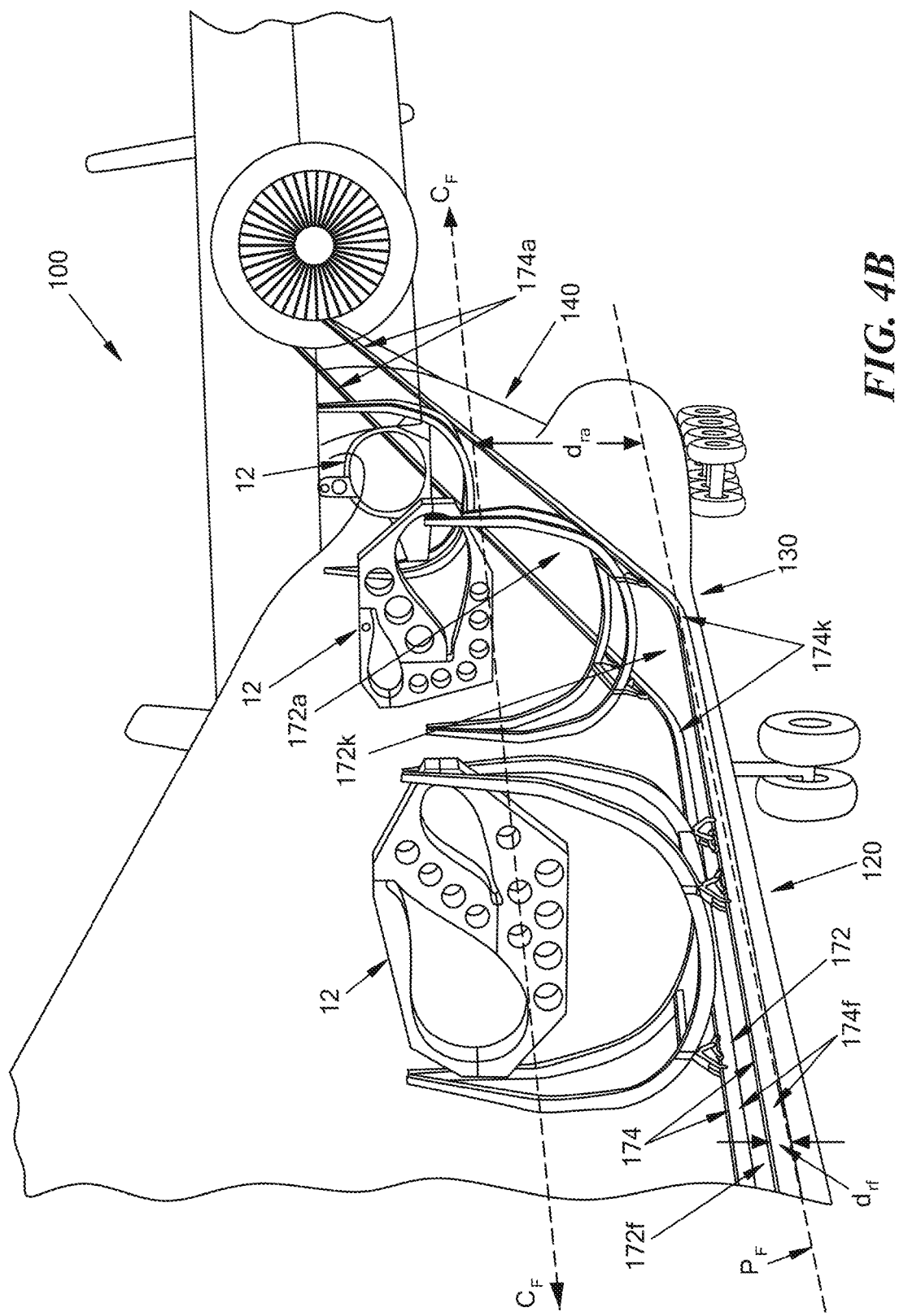
FIG. 4B is a detailed, front-side isometric, transparent view of the aircraft of FIG. 4A with wind turbine blades of the payload hidden from view to better illustrate a pair of rails disposed in the interior cargo bay and exemplary payload-receiving fixtures for holding the wind turbine blades coupled to the rails.
Figure 4C:
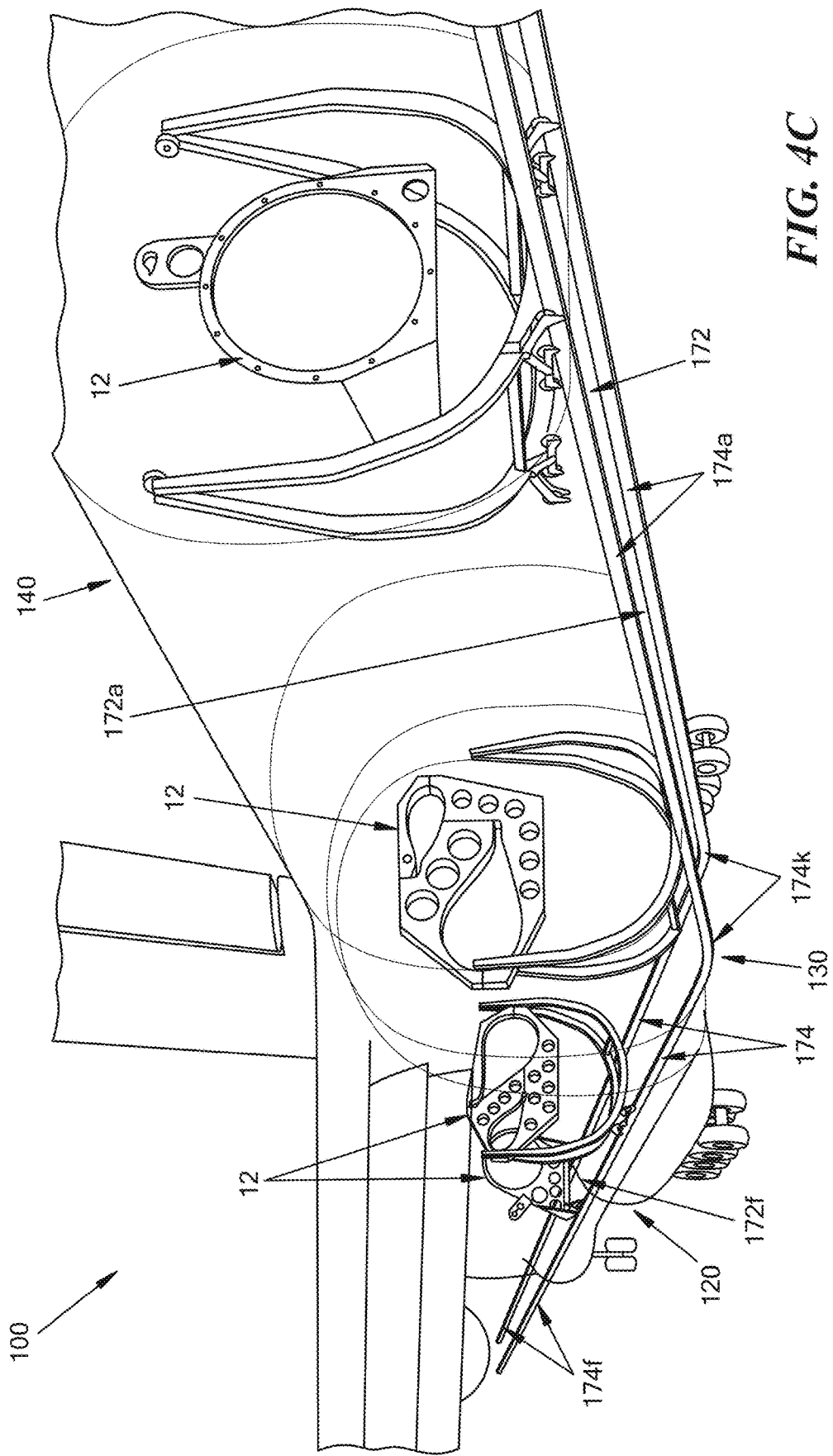
FIG. 4C is a detailed, back-side isometric, transparent view of the aircraft of FIG. 4B.

Hidden from view in the previous figures of the aircraft 100, but illustrated in FIGS. 4A-4C are a pair of rails 174 coupled to, extending from, or otherwise associated with the bottom contact surface 172 of the cargo bay 170. Some of the illustrations may look incomplete or incompatible with other figures, such as having rails extending beyond what looks like the terminal end of a fixed portion of the fuselage (see, e.g., FIG. 4C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures. Embodiments of the rails and fixtures disclosed herein can be used to dispose an end of a payload into a cargo bay region of a tailcone. In some embodiments, the tailcone includes a rail system configured to form an extension of the rail system in the fuselage 101. In some embodiments, the tailcone includes features configured to secure the end of the payload during flight.

Much like the bay 170 and the bottom contact surface 172, the rails 174 can extend in a continuous manner from the forward end 120, through the kinked portion 130, and into the aft end 140. The rails 174 can thus be configured to have a forward end 174f, a kinked portion 174k, and an aft end 174a. As a result of the kinked portion 174k, a vertical distance $d_{ra}$ between the aft end 174a and a plane $P_F$ defined by an interior bottom contact surface of the interior cargo bay 170 in the forward end 120 of the aircraft 100, i.e., the plane $P_F$ extending longitudinally and laterally through the forward end 172f of the bottom contact surface 172 and that is substantially parallel to the forward centerline $C_F$, is greater than a vertical distance $d_{rf}$ between at least a portion of the forward end 174f and the plane $P_F$. Further, in some embodiments in which the aft end 140 extends above a plane extending substantially through an entirety of the top surface 102 of the forward end 120 of the fuselage 101 such that the plane is substantially parallel to ground, because the rails 174 can extend towards and into the fuselage tail cone 142, a portion of at least one of the rails 174, as shown both rails 174, disposed in the aft bay portion 172a can also be located above the plane extending substantially through an entirety of the top surface 102 of the forward end 120 of the fuselage 101. The angle at which the rails 174 are disposed in the aft bay portion 170a can be akin to a kink angle of the fuselage. More generally, the rails 174 can extend in a manner such that a majority of it disposed in the aft bay portion 170a is disposed at the kink angle. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 101, capable of bearing operational flight and/or ground loads, akin to a keel beam in some aircraft.

A payload, such as the payload 10, can be translated along the rails 174 from the forward end 174f and towards the aft end 174a until the payload reaches a desired location. That desired location can relate, for example, to placing a center of gravity of the payload within a desired range of a center of gravity of the aircraft. Translation of the payload can be aided by the fixtures 12 illustrated in FIGS. 4A-4C. The fixtures 12 can have a variety of configurations that are configured to both receive a payload, such as wind turbine blades 11A, 11B (of fewer or more blades as desired) and translate along the rails 174 to place the payload at the desired location(s).

A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, and thus such usage of the term "payload-receiving fixture" herein, including in the claims, can be directed to just a receiver as provided for herein. Generally, that term in any claim should be read in that manner, unless such interpretation would be incompatible with the remaining portion of the claim, for example, if the claim separately recites a receiver.

Additional details about tooling for cargo management, including rails and payload-receiving fixtures and fuselage configuration for enabling loading and unloading of payloads into aft regions of a continuous interior cargo bay are provided in International Patent Application No. PCT/US2020/049784, entitled "SYSTEMS AND METHODS FOR LOADING AND UNLOADING A CARGO AIRCRAFT," and filed Sep. 8, 2020, and the content of which is incorporated by reference herein in its entirety.

Removable and Modular Cargo Floor Segments

Figure 5:
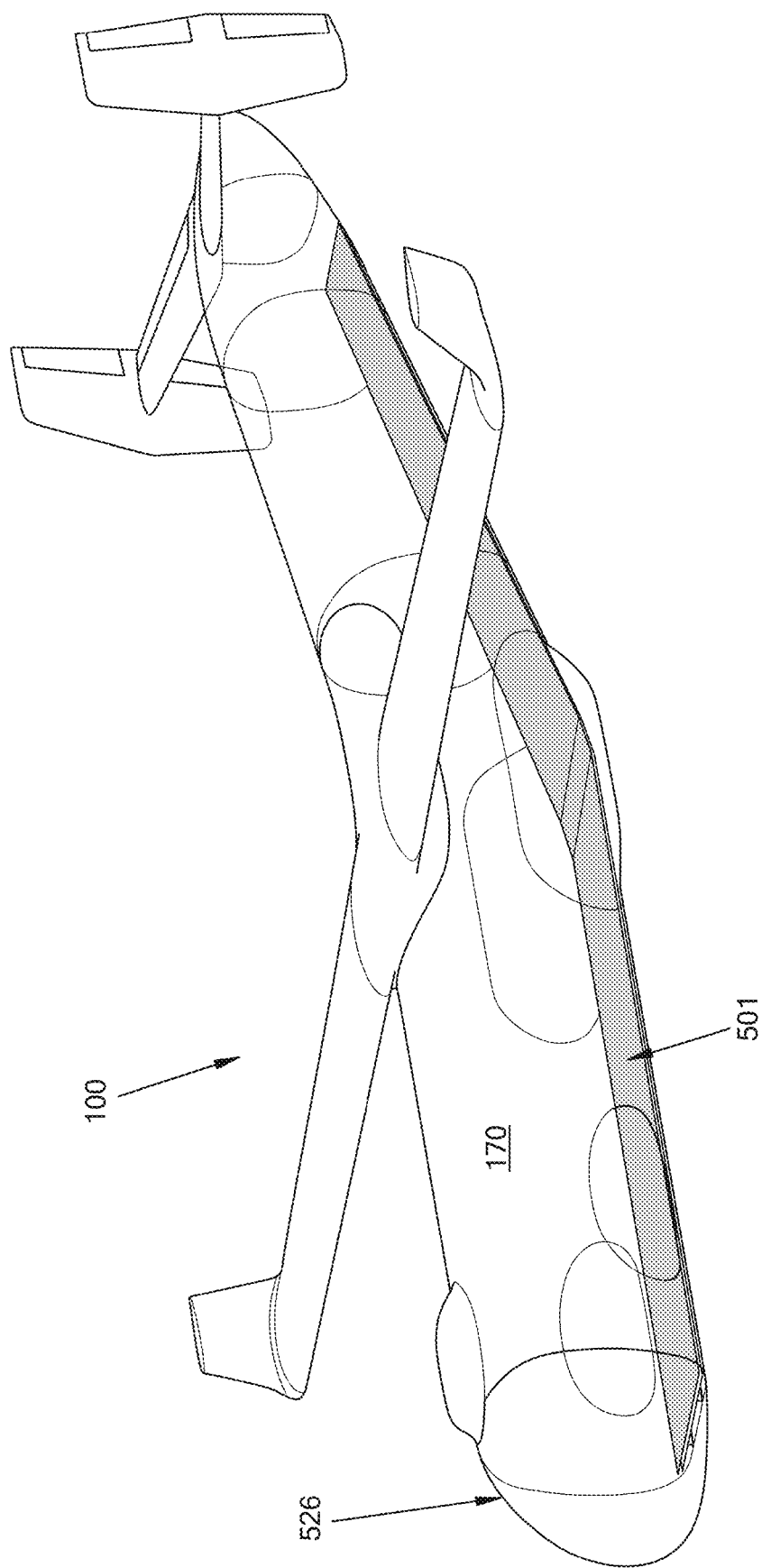
FIG. 5 is an isometric, partial translucent view of the aircraft of FIG. 4A with a plurality of removable cargo bay floor segments loaded into the interior cargo bay to form a continuous flat cargo bay floor.

FIGS. 4A-4C show the bottom contact surface 172 located in the interior cargo bay 170, which includes the rails 174 spanning the longitudinal length of the bottom contact surface 172. In order for a cargo aircraft 100 to have as large of a cargo bay 170 as possible, with as little added weight as possible, the bottom contact surface 172 can be, effectively, the inner-facing side of the exterior skin of the fuselage. In such an arrangement, the bottom contact surface 172 is not designed to carry any of the weight of the payload, or at least any significant weight, on its surface. Instead, the rails 174 are structurally integrated with the fuselage 101 to carry the weight of the payload and direct the weight to be supported by the wings 182, 184 during operation. Accordingly, if more traditional aircraft cargo payloads (e.g., pallets) are to be carried in the aircraft 100, there exists a need to provide a traditional cargo bay floor that can receive and support traditional aircraft cargo payloads on the rails 174. One category of solutions involves a plurality of cargo bay floor segments that removeably attach to the rails 174 and can be advanced into the cargo bay 170 to form a continuous flat cargo bay floor 501, as shown in FIG. 5. Alternatively, one or more individual floor regions made of multiple floor segments can be created. In FIG. 5, a number of cargo bay floor segments are shown placed adjacent to each other to form the floor 501 of the cargo bay 170 of the aircraft 100, with each of the cargo bay floor segments providing a flat cargo bay floor upper surface and having an attachment system for coupling to, and being advanced along, the rails 174, as described and shown in more detail herein.

Figure 6A:
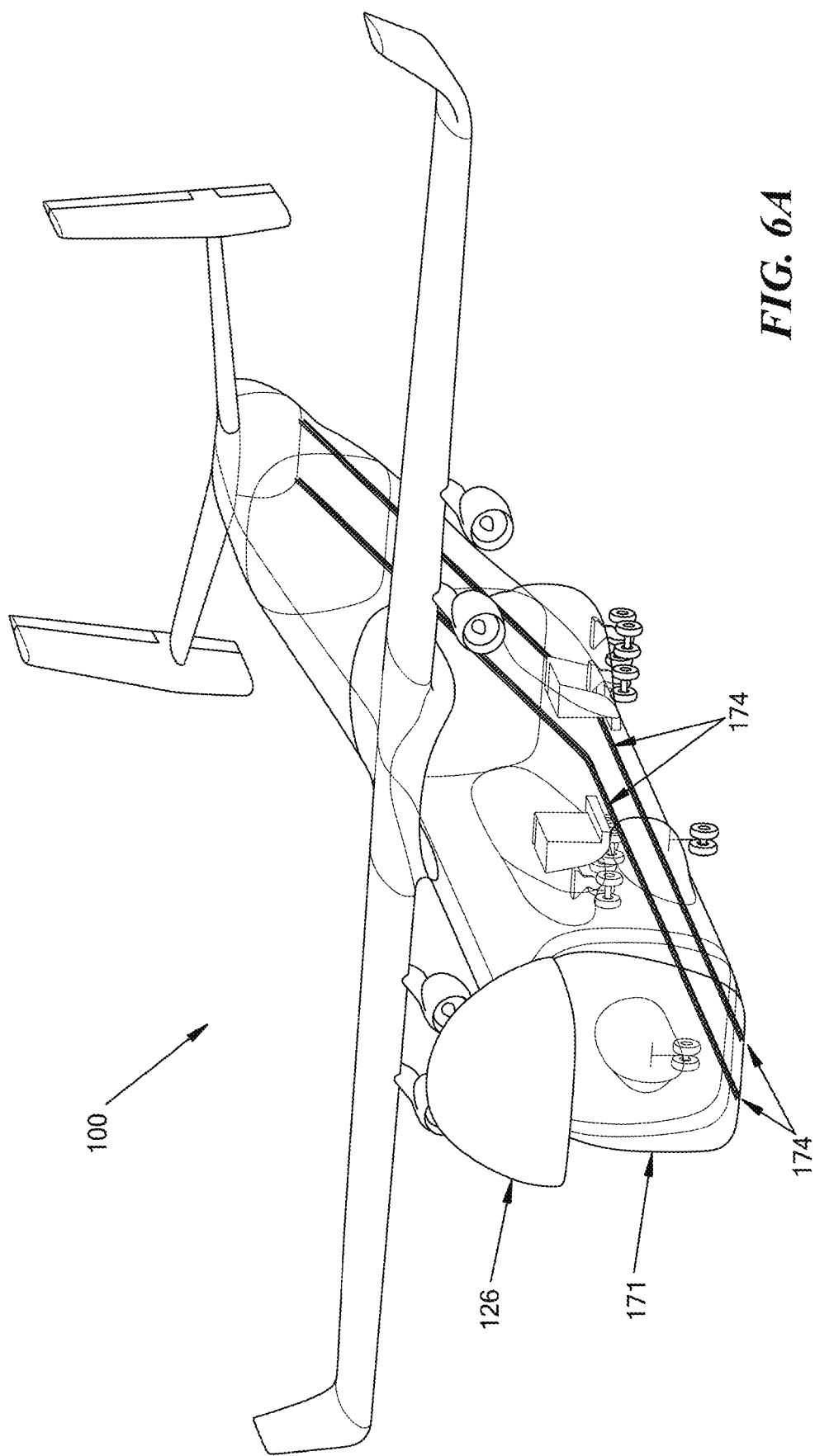
FIG. 6A is an isometric, partial translucent view of the aircraft of FIG. 5 with the plurality of removable cargo bay floor segments removed.

FIG. 6A is a partial translucent view of the aircraft of FIG. 5, although the plurality of removable cargo bay floor segments that form the floor 501 in FIG. 5 are absent. As shown, the aircraft 100 is in a configuration to accept a payload through the opening 171 along the rails 174 or one or more cargo bay floor segments. This configuration also allows it the aircraft 100 to accept one or more of the plurality of removable cargo bay floor segments.

Figure 6B:
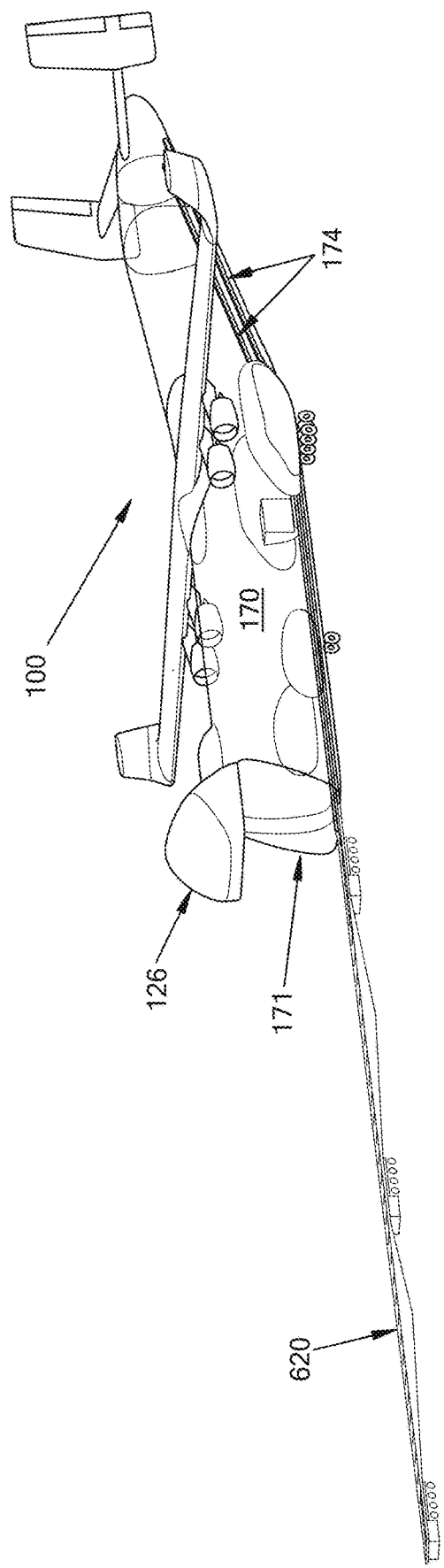
FIG. 6B is an isometric, partial translucent view of the aircraft of FIG. 6A arranged to be loaded from a ground-based cargo loading system.
Figure 6C:
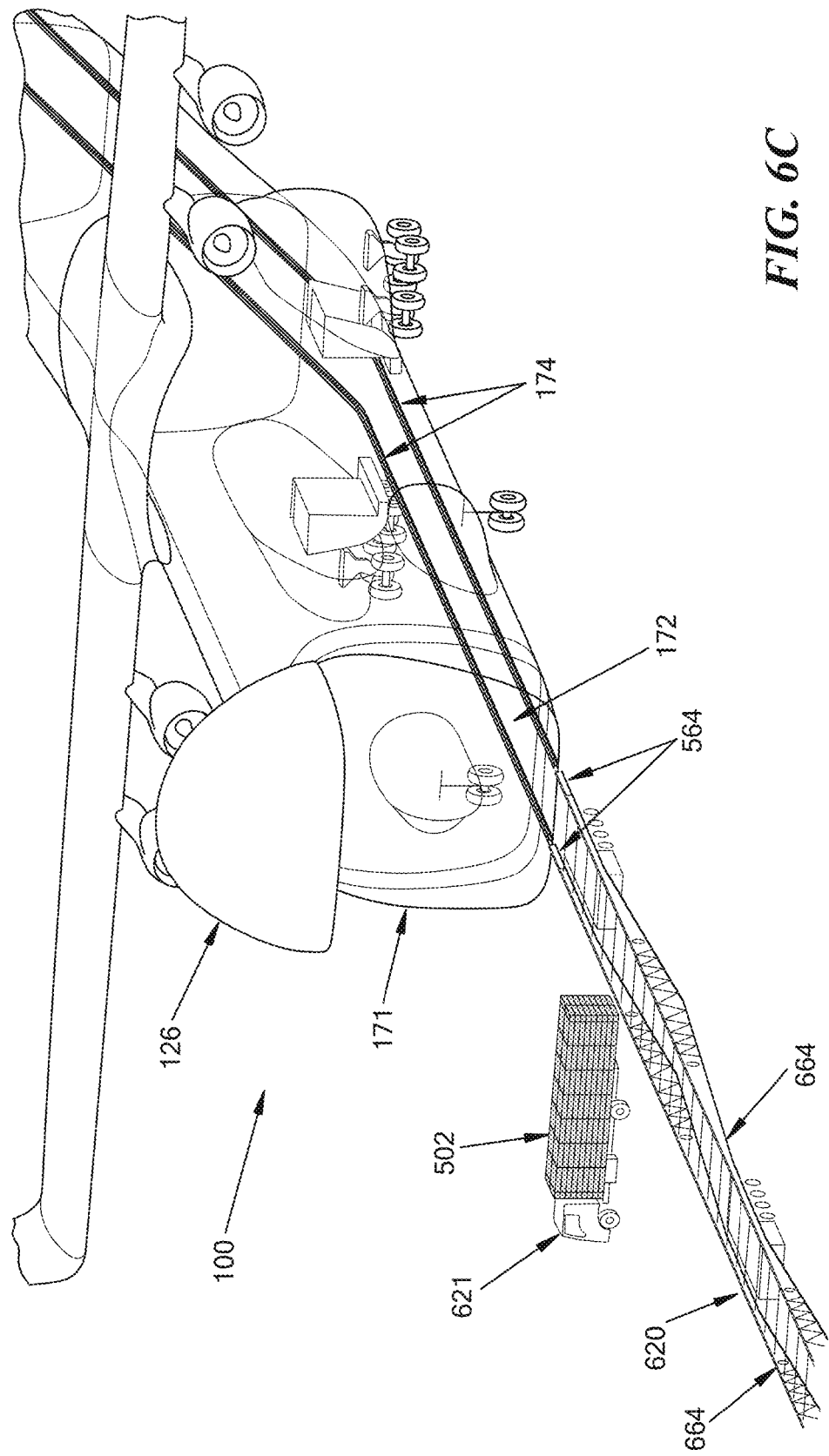
FIGS. 6C-6G are isometric, partial translucent views of the aircraft of FIG. 6B having a removable cargo bay floor segment loaded from the ground-based cargo loading system and advanced into the aft end of the interior cargo bay.

FIGS. 6B-6G show an exemplary process of loading and installing cargo bay floor segments in the aircraft 100. As shown in FIG. 6B, a ground-based cargo loading system 620 can be positioned adjacent to the aircraft 100 so that the aircraft 100 can receive floor segments from the ground-based cargo loading system 620 for subsequent installation in the cargo bay 170 of the aircraft 100. The ground-based cargo loading system 620 can be, for example, a transport vehicle 20 or a stationary installation that includes rails 664, as shown in FIG. 6C, that are mated via rail connectors 564 with the rails 174 of the aircraft 100 when the nose cone 126 is open.

In FIG. 6C, the aircraft 100 is positioned to receive cargo bay floor segments 502 that are first positioned on the rails 664 of the ground-based cargo loading system 620 after being delivered to the location of the ground-based cargo loading system via a truck 621 or other transportation vehicle. In some instances, the cargo bay floor segments 502 may be stored on location or otherwise already disposed on the ground-based cargo loading system 620 when the aircraft 100 arrives.

Figure 6D:
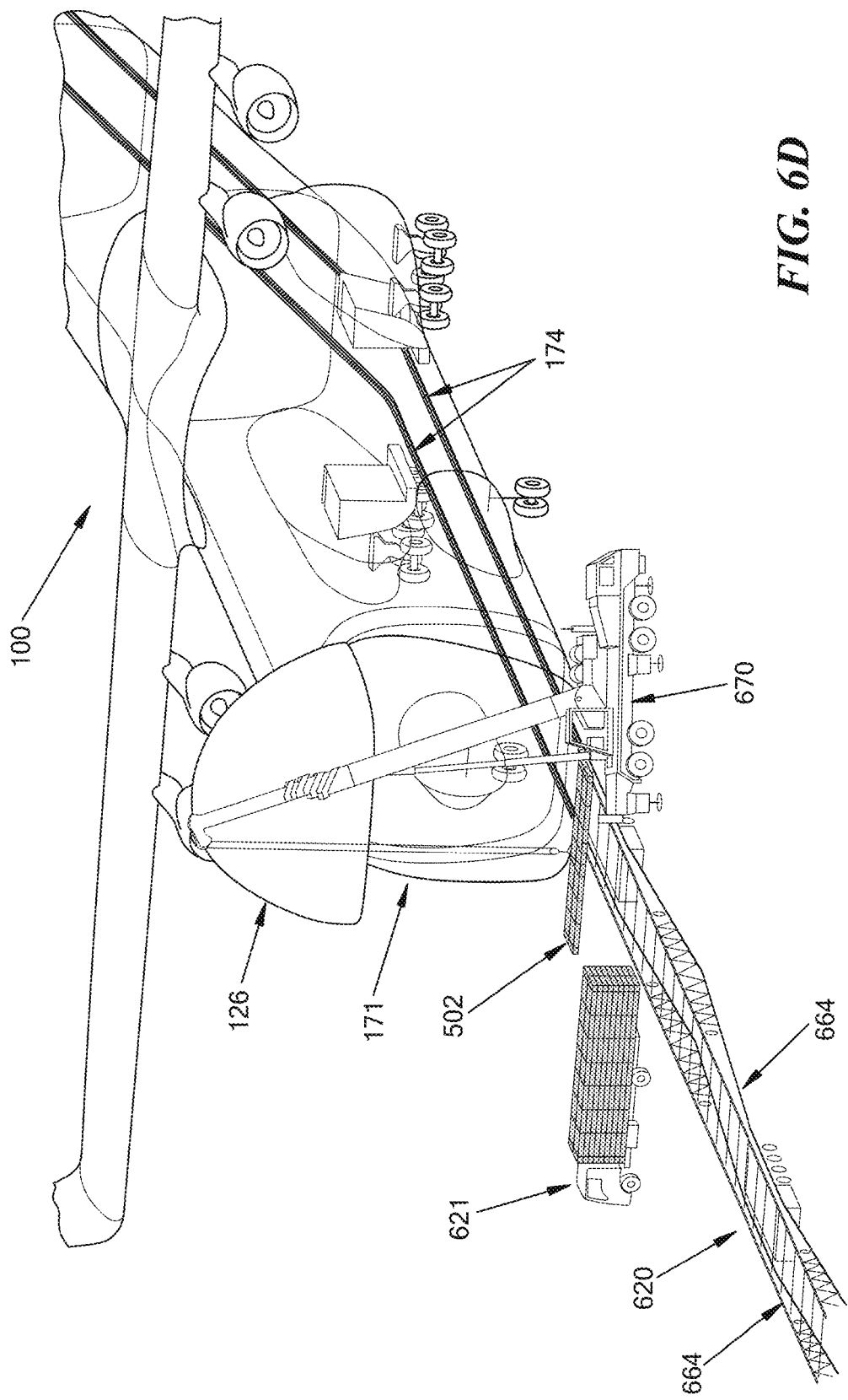
Figure 6E:
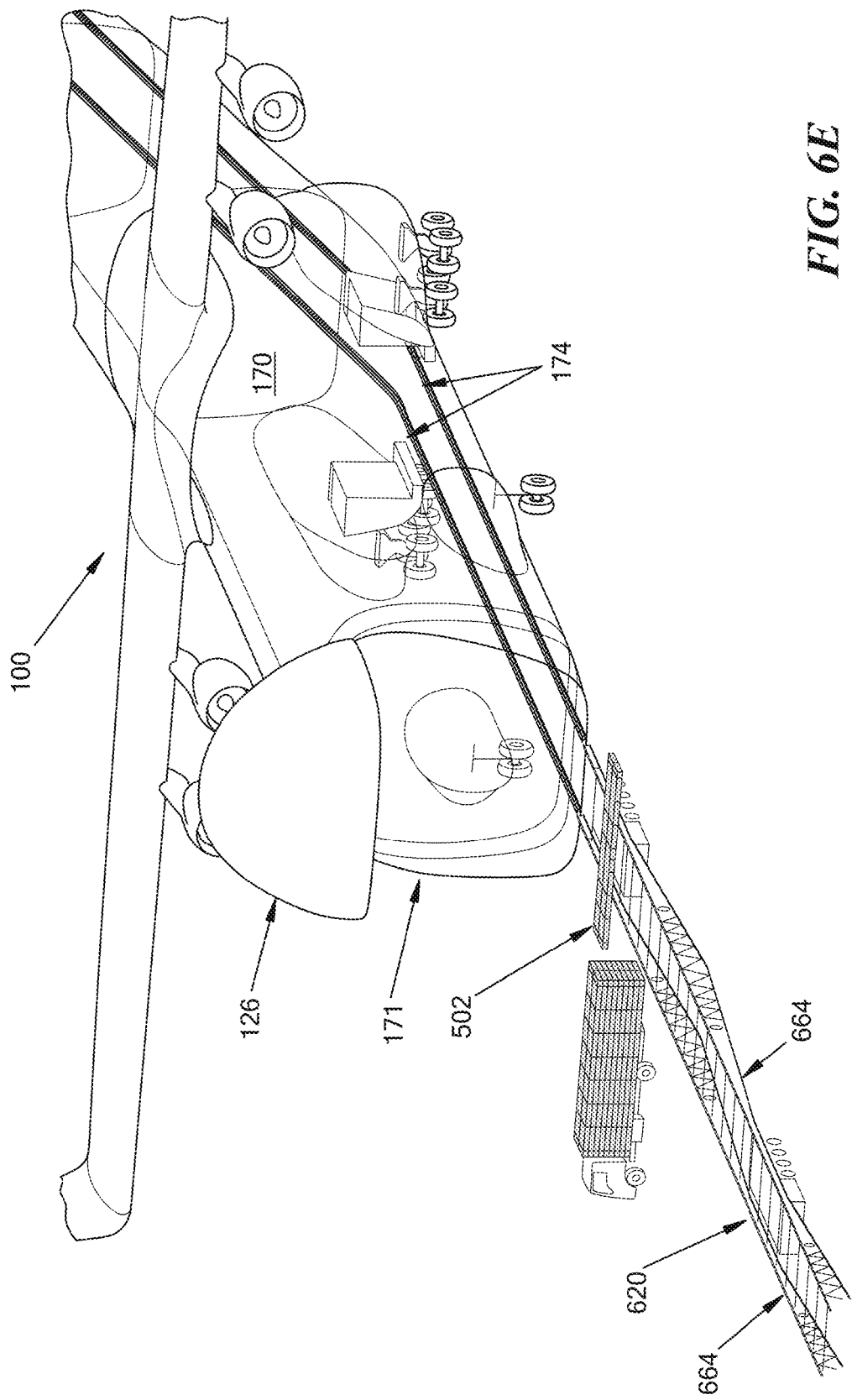
Figure 6F:
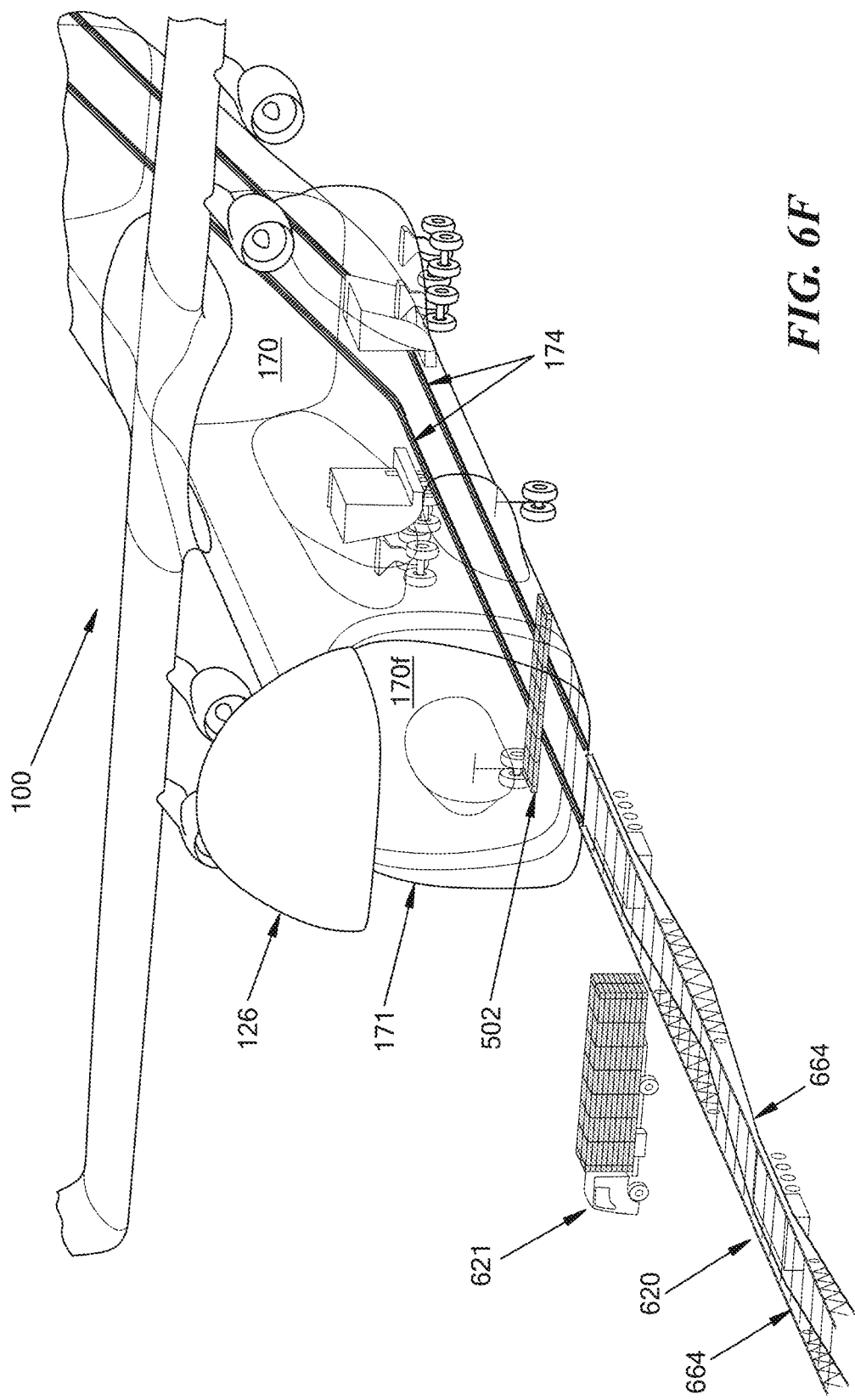
Figure 6G:
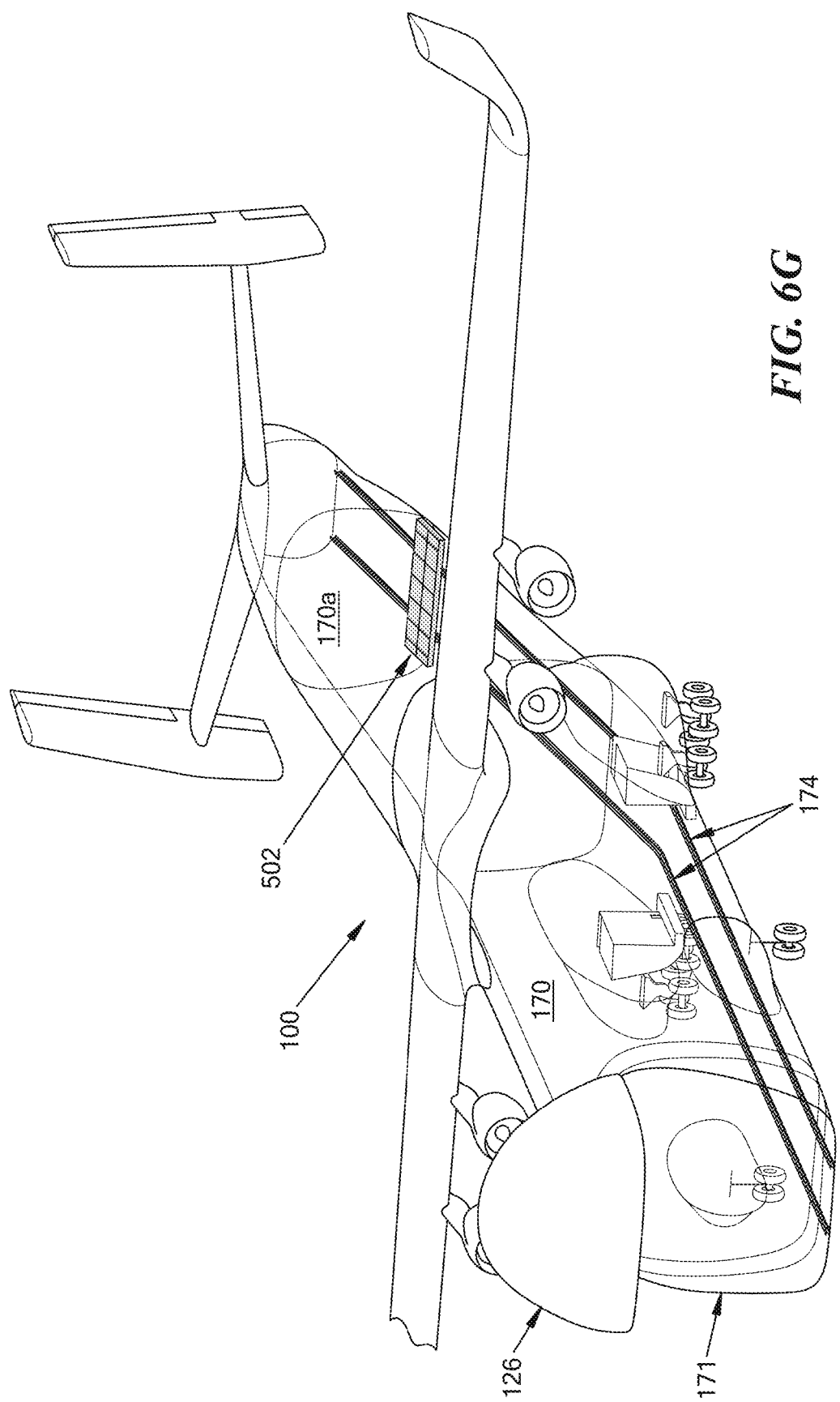

Continuing, in FIG. 6D a crane 670 or other device capable of moving a floor segment from the truck 621 and onto the rails 664 lifts each cargo bay floor segment 502 from the truck 621 and onto the rails 664 of the ground-based cargo loading system 620. In FIG. 6E, the cargo bay floor segment 502 is now coupled to the rails 664 of the ground-based cargo loading system 620 and the cargo bay floor segment 502 can be advanced along the rails 664 until the cargo bay floor segment 502 is transferred to the rails 174 of the aircraft 100, as shown in FIG. 6F. Next, as shown in FIG. 6G, the cargo bay floor segment 502 can be advanced to a desired position along the rails 174 in the cargo bay 170. In the illustrated embodiment, the desired position is within the aft region 170a of the interior cargo bay 170. Next, or even as the first cargo bay floor segment 502 is advanced into the aircraft 100, one or more additional cargo bay floor segments 502 can be loaded and advanced into position behind the first cargo bay floor segment 502. In some instances, the aircraft 100 may arrive at the ground-based cargo loading system 620 with a complete set of cargo bay floor segments 502 already disposed on the rails 664 ready to be loaded, together, or one or more at a time, into the cargo bay 170.

The loading process of FIG. 6B-6G is representative of one way of loading the cargo bay floor segments, but others are contemplated. Such as, for example, a lifting device, crane, or winch being used directly on the aircraft 100 at the opening 171 to pick up and position the cargo bay floor segments on the rails 174, or a ramp or rail extension being deployed from the opening 171 to allow ground-level loading of the cargo bay floor segments from a ground-level rail or transport. In some examples, the rail connectors 564 can be connected with or carried by the aircraft 100 and selectively deployed during a loading operation.

Additionally, one or more locomotive or linear-drive system can be employed to assist in the loading and advancement of the cargo bay floor segments 502 into the cargo bay 170. This can likewise be done using various combinations of one or more winches, pulleys, cables, cranes, and/or power drive units, such set-ups and configurations being known to those skilled in the art. These systems may be integrated with the aircraft 100 or introduced during a loading operation. Examples include self-powered cargo bay floor segments 502 that have one or more onboard motors that can be internally or externally controlled to advance the cargo bay floor segments 502 to specific predefined positions in the cargo bay 170. Accordingly, the cargo bay floor segments 502 may include sensors to enable onboard or external controller systems to determine the position of the cargo bay floor segments 502 in the cargo 170 bay during their loading. This can allow for manual and/or automated installations of the cargo bay floor segments 502 in the cargo bay 170, where manual installations involve one or more humans controlling the installation and automated installations are controlled by a computer or the like in view of the input and feedback from sensors and the like. As described in more detail below, the cargo bay floor segments 502 may include mechanisms for securely locking the cargo bay floor segments to the rails 174 or other structural elements in the cargo bay 170, and the activation of these mechanisms may be automated as well.

As a representative example, a plurality of cargo bay floor segments may be sequentially loaded into a cargo bay 170, and each cargo bay floor segment may be pre-programmed with a desired location, or may otherwise determine a desired position along the rails 174 and proceed to advanced autonomously along the rails 174 and activate a securing mechanism when in place. This can further include a visual indication (e.g., a green light being turned on) on each cargo bay floor segment once it has reached the desired location and successfully been secured to the aircraft 100. One or more of these steps can be manually operated or controlled. For example, an operator may control each self-powered cargo bay floor segment remotely or locally and any desired location may be a function of the cargo bay floor segments already secured in the cargo bay 170. Additionally, due to safely concerns, it may be desired that any secured fixing of the cargo bay floor segments to the aircraft 100 be done by hand, such as by inserting a locking pin. One skilled in the art will appreciate that a number of different combinations and variations of the loading and securing of the cargo bay floor segments exists and should be considered within the scope of the present disclosure.

Figure 7:
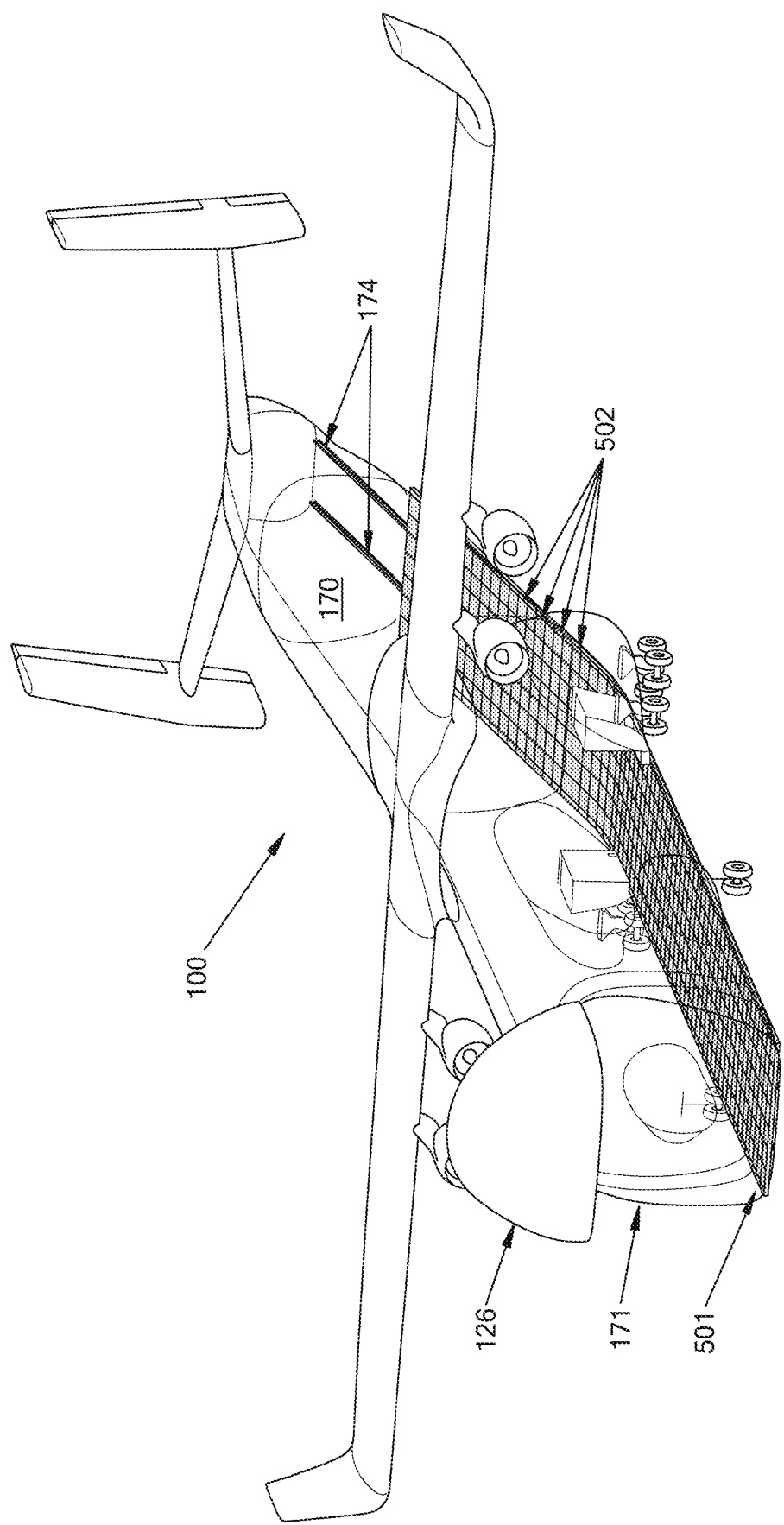
FIG. 7 is an isometric, partial translucent view of the aircraft of FIG. 6G with continuous interior cargo bay floor formed from a plurality of removable cargo bay floor segments.

Once the desired number of cargo bay floor segments 502 are in place, a continuous flat cargo bay floor 501 can be established from the opening 171 to an aft location, as shown in FIG. 7. Notably, while the cargo bay floor segments 502 have been described as being used to form a flat cargo bay floor, this is only a representative example. Other cargo bay floor segments can be used to produce a non-flat floor, such as a floor sized and shaped to hold specific types and shapes of cargo. Moreover, each cargo bay floor segment can be configured to have a number a different cargo-mating features, such as protractions, recesses, tie-down locations, or even more advanced support configurations, such structures that unfold from the cargo bay floor segments 502 for use in covering or supporting tops or sides of irregular or loose cargo.

Translating and Securing Cargo Floor Segments

Figure 8A:
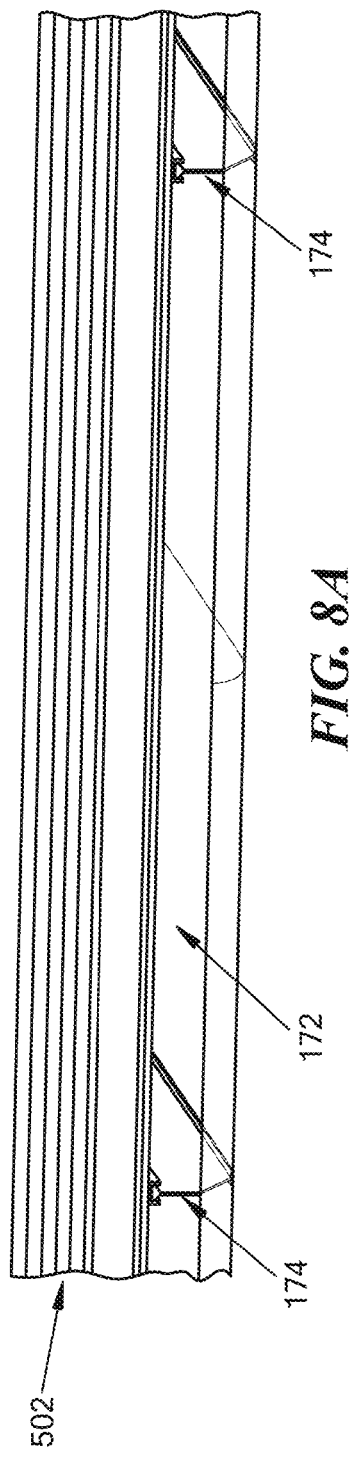
FIG. 8A is a perspective side view of one embodiment of an interface between a removable cargo floor segment and a cargo bay rail system.

The cargo bay floor segments 502 can be both advanced along the rails 664, 174 and secured in place with a variety of different means. FIG. 8A shows a simple configuration of a cargo bay floor segment 502 on two rails 174 in the cargo bay 170 of the aircraft 100. The cargo bay floor segment 502 is resting on the rails 174 such that the weight of any cargo subsequently placed on the cargo bay floor segment 502 will be transferred to the aircraft 100 via the rails 174. The cargo bay floor segment 502 spans both rails 174 and extends laterally beyond each rail 174. The cargo bay 170 of the aircraft 100 includes two rail 174, but other configurations are possible, such as a single rail or three or more rails. The cargo bay floor segment 502 can be configured to allow for different cargo weight loading configurations across the lateral length of the cargo bay floor segment 502, depending on the particular structural design of the cargo bay floor segment 502.

Figure 8B:
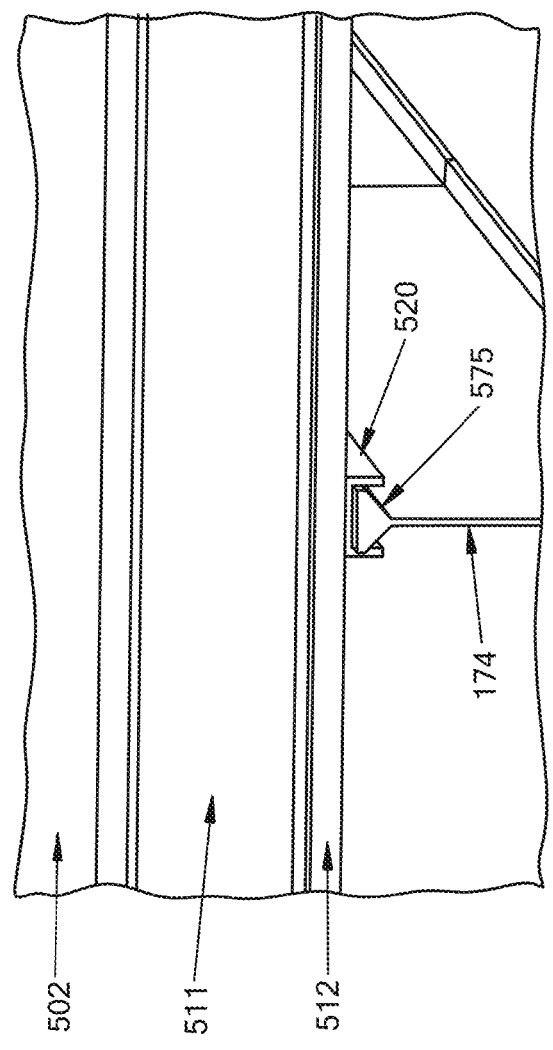
FIG. 8B is a detailed perspective view of the interface of FIG. 8A.

One skilled in the art will appreciate that a number of different structural configurations are possible for the cargo bay floor segment 502, depending, at least in part, on the rails 174, the desired cargo loading, and the interface between the cargo bay floor segment 502 and the rails 174. This interface is shown in more detail in FIG. 8B, where an interface channel 520 is shown disposed on the underside of the cargo bay floor segment 502 and sized to partially capture (i.e., extend across and down each side) a top end 575 of the rail 174. In this configuration, the cargo bay floor segment 502 can be moved longitudinally along the rail 174 but is substantially fixed laterally. The interface channel 520 can have, for example, a plurality of rollers or linear bearings to enable the longitudinal movement of the cargo bay floor segment 502 along the rail 174. The downward extension of the interface channel 520 around the top end 575 of the rail 174 can prevent the cargo bay floor segment 502 from being easily decoupled from the rail 174 during translation. The interface channel 520 can span some or all of the longitudinal length of the cargo bay floor segment 502.

In some embodiments, the interface channel 520 can facilitate the final securing of the cargo bay floor segment 502 to the rail 174, for example, by allowing a locking pin to be disposed laterally through the interface channel 520 and into or through the rail 174 such that the cargo bay floor segment 502 can no longer move significantly or meaningfully along the rail 174 longitudinally (i.e., along a length of the cargo bay from the forward to aft section) or be lifted upwards away from the rail 174.

In some embodiments, the cargo bay floor segment 502 can be more restrictively coupled to the rails 174 from the start, for example, by way of an interface channel 520 or other structure that captures an overhang of the top end 575 of the rail 174 such that the cargo bay floor segment 502 cannot be lifted off the rail 174 once attached. This additional engagement can be a passive configuration of the interface channel 520 or it can be a configuration that the interface channel 520 is moved into once the interface channel 520 is initially engaged with the rail 174 during the start of a loading operation (e.g., when being placed on the rails 664 of the ground-based cargo loading system 620 or on the rails 174 of the aircraft 100). The interface channel 520 can generally be described as an interface region that contains at least some of the direct contact between the rail 174 and the cargo bay floor segment 502.

Figure 9A:
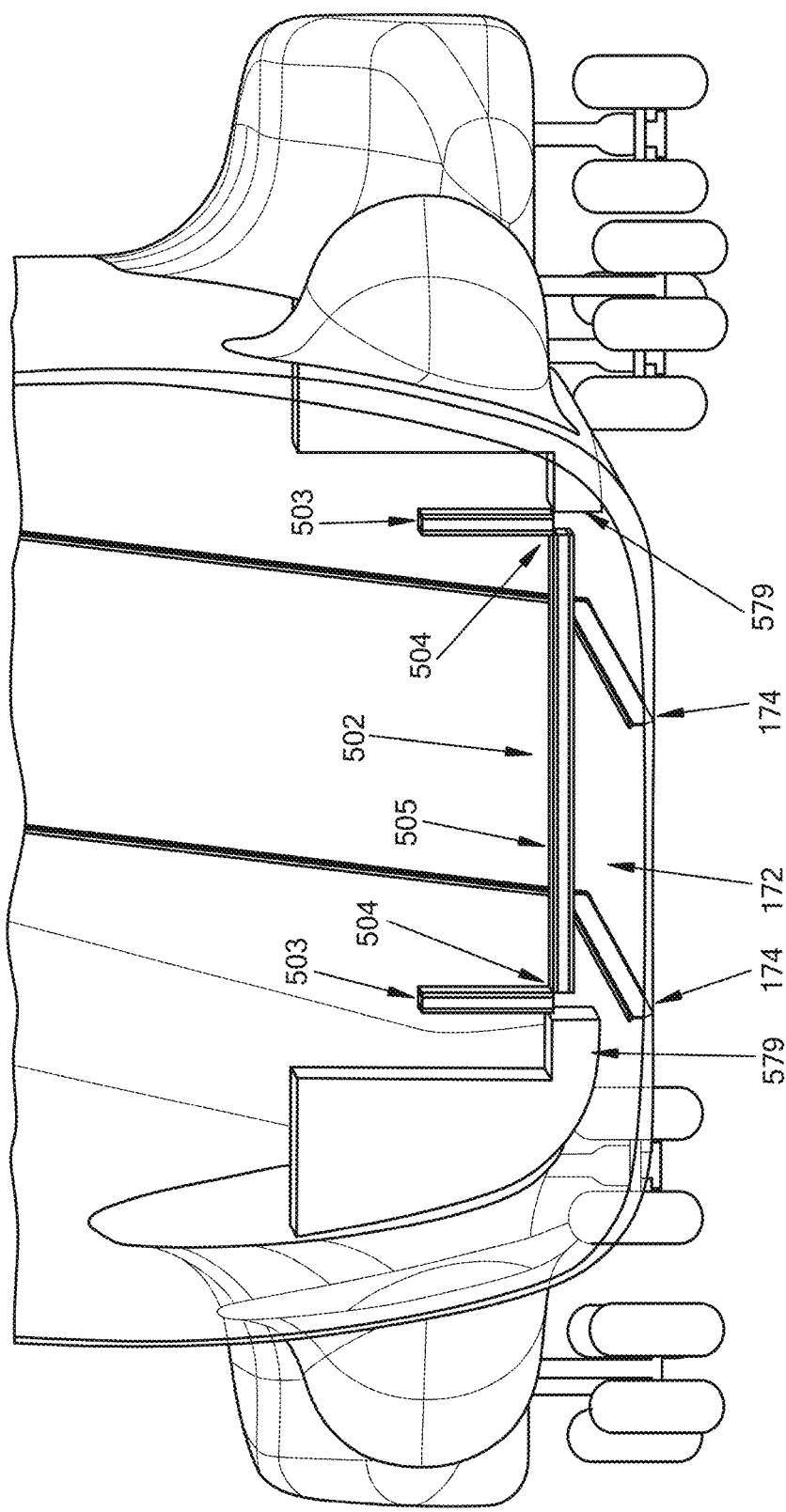
FIG. 9A is a perspective view of one embodiment of a removable cargo bay floor segment having foldable lateral ends.
Figure 9B:
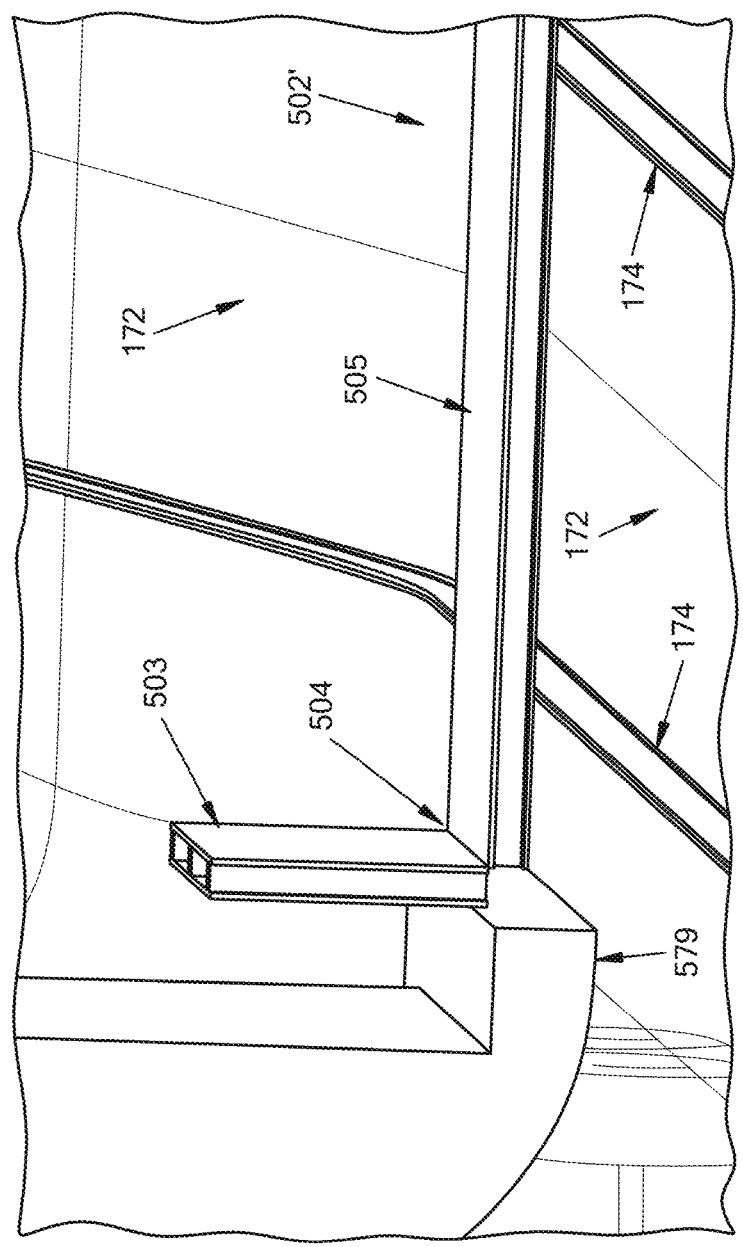
FIG. 9B is a detailed perspective view of one of the foldable lateral ends of the cargo bay floor segment of FIG. 9A.

During transit of the cargo bay floor segment 502 through the cargo bay 170 along the rails 174, there may be sections of the cargo bay 170 that, at the level transited by the cargo bay floor segment 502, have inclusions or obstacles that the cargo bay floor segment 502 must pass. For example, FIGS. 9A and 9B shows one such obstacle, which is an inner housing of a wheel well 579 that prevents a static cargo bay floor segment 502 from passing along the rails 174. To account for the same, the cargo bay floor segments 502 may have moveable parts.

In FIGS. 9A and 9B, a cargo bay floor segment 502' includes a stationary region 505 that is coupled with the rails 174 and a moveable lateral end 503 that is rotatable about a hinge connection 504 with the stationary region. In this manner, and as shown, the moveable lateral end 503 can be rotated to move out of the way of the wheel well 579 and enable the cargo bay floor segment 502' to advance into the aft region of the cargo bay 170. FIGS. 9A and 9B show that the cargo bay floor segment 502' can include moveable lateral ends 503 on both lateral sides, enabling the cargo bay floor segment 502' to move past the opposing wheel wells 579, thereby reduce a minimum lateral clearance of the cargo floor segment 502. Similarly, as the cargo bay 170 may taper, especially in the aft region 170a, the cargo bay floor segment 502 can have different shapes that enable each cargo bay floor segment 502 to fit into a different position along the cargo bay 170. Alternatively, or additionally, some cargo bay floor segments 502 may have swappable lateral ends that enable customizing a cargo bay floor segment 502 to fit a particular shape. Alternatively, or additionally, some cargo bay floor segments 502 may have telescopic, rotating, and/or extending lateral ends that can adjust, retract, rotate, and/or extend, as desired or necessary.

Figure 10A:
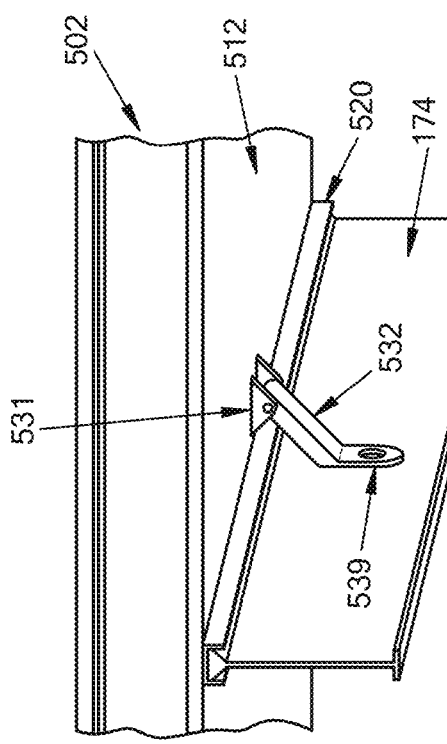
FIG. 10A is an isometric view of one embodiment of a geometric coupling arrangement for a removable cargo bay floor segment, the geometric coupling arrangement being in an unengaged position.
Figure 10C:
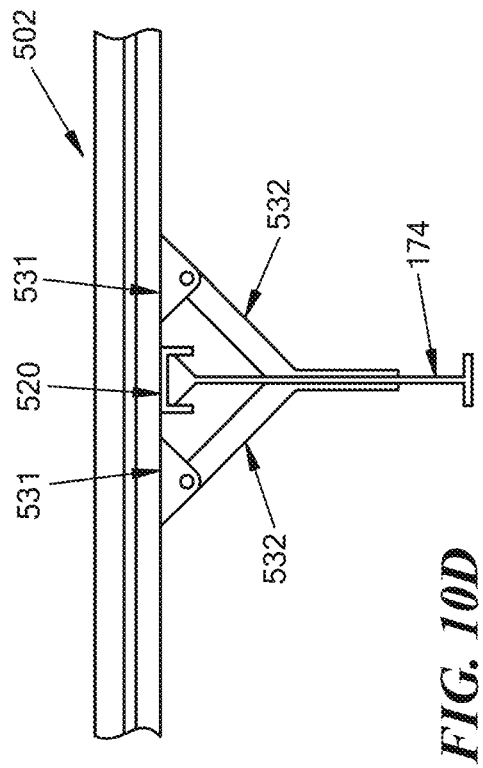
FIG. 10C is the isometric view of the geometric coupling arrangement of FIG. 10A with the geometric coupling arrangement being in an engaged position.
Figure 10B:
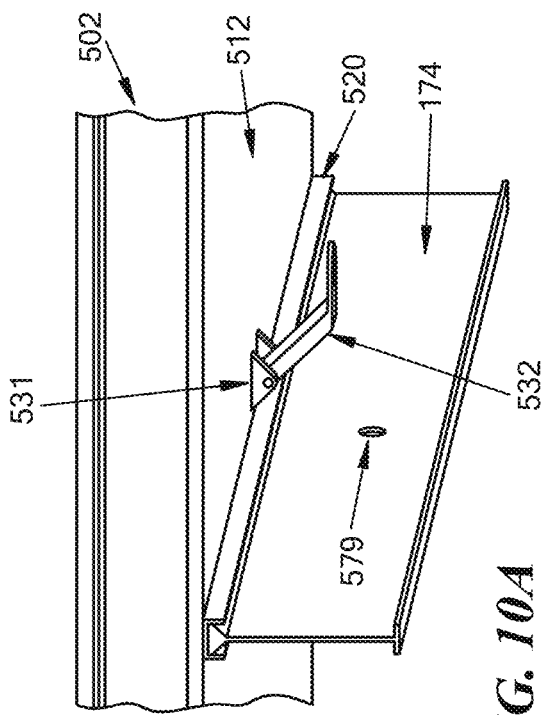
FIG. 10B is a front view of the geometric coupling arrangement of FIG. 10A.
Figure 10D:
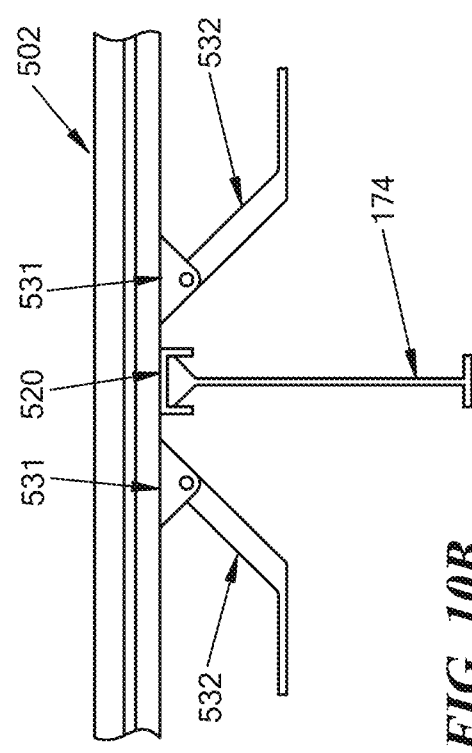
FIG. 10D is the front view of the geometric coupling arrangement of FIG. 10C.
Figure 10F:
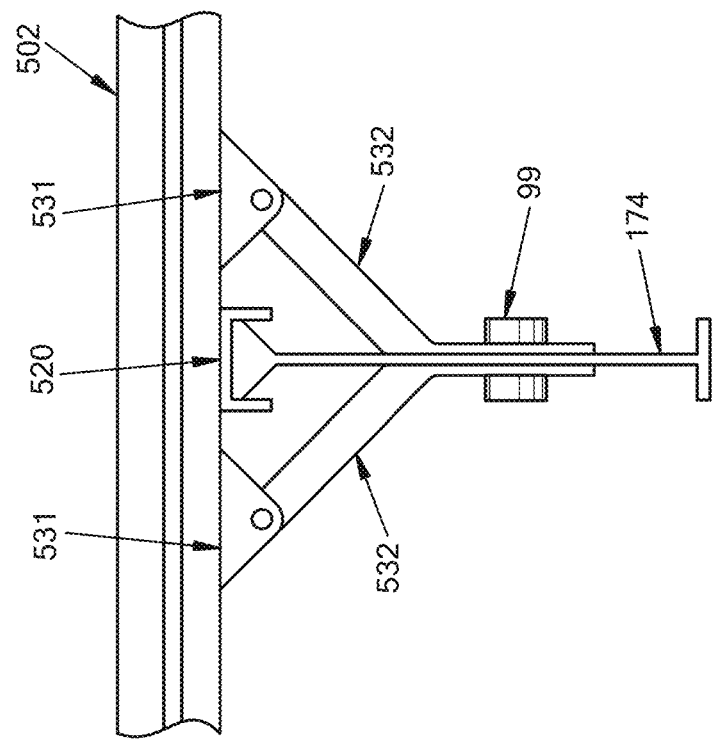
FIG. 10F is the front view of the geometric coupling arrangement of FIG. 10E.
Figure 10E:
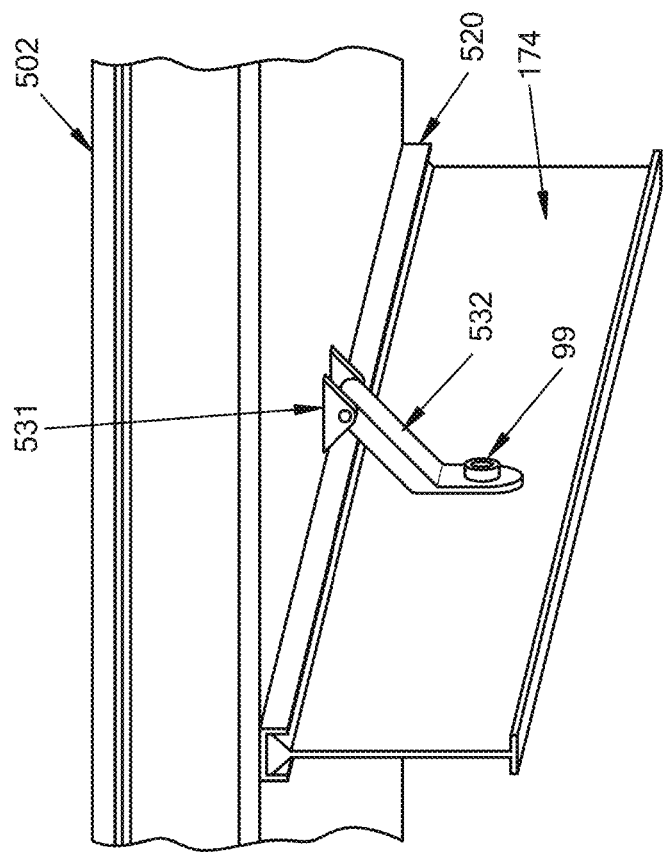
FIG. 10E is the isometric view of the geometric coupling arrangement of FIG. 10C with a locking pin associated therewith.

Once a cargo bay floor segment 502 is advanced to a desired location, the cargo bay floor segment 502 can be fixedly secured to the aircraft 100 by, for example, being secured to the rail 174, as shown in FIGS. 10A-10F. In FIG. 10A, a cargo bay floor segment 502 is disposed in a desired location along a rail 174 and is in contact with the rail 174 via an interface channel 520. At this location in the rail 174, a hole 579 can be present and the cargo bay floor segment 502 can be secured to the rail 174 via a locking pin 99 (FIGS. 10E and 10F). FIG. 10A also shows that the cargo bay floor segment 502 includes a fixation arrangement or mechanism that includes two opposed arms 532 connected to the cargo bay floor segment 502 via pivots 531. Accordingly, once the cargo bay floor segment 502 is positioned such that the arm 532 is aligned with the hole 579 in the rail 174, the arms can be moved against the rail 174 about the hole 579, as shown in FIG. 10C and FIG. 10D, such that a corresponding hole 539 in each arm 532 can be positioned in-line with the hole 579 in the rail. Finally, and as shown in FIGS. 10E and 10F, a locking pin 99, or other structural equivalent known to those skilled in the art, can be disposed through each hole 539 in the arms and the hole 579 in the rail, thereby locking the cargo bay floor segment 502 in place such that the cargo bay floor segment 502 cannot be translated along the rail 174 or lifted away from the rail 174. FIGS. 10A-F are just one example of a locking arrangement, and several different arrangements for securing a structure along a rail exist and will be appreciated by one of ordinary skill in the art.

Figure 11C:
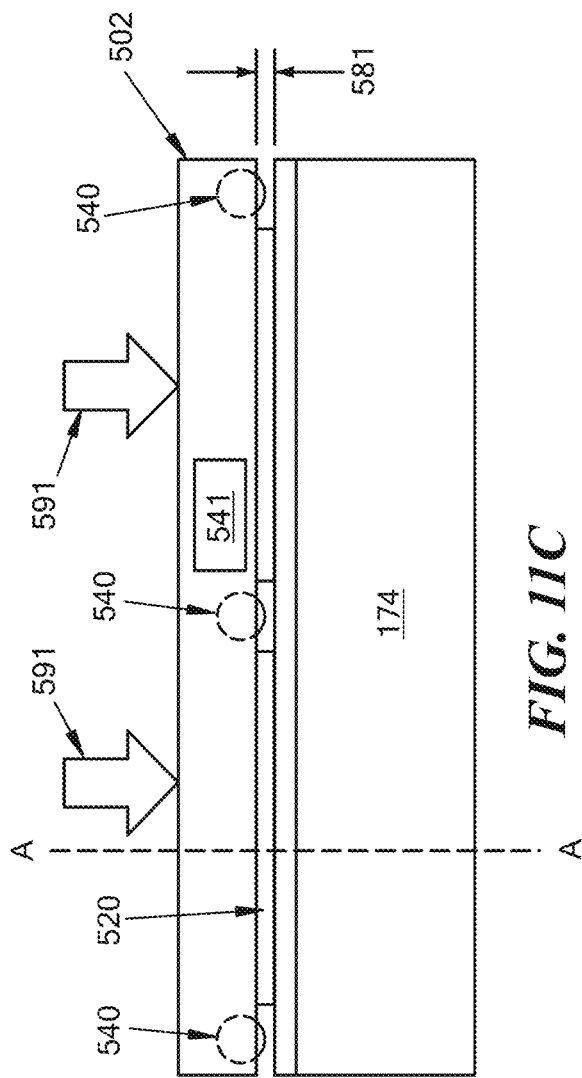
FIG. 11C is the schematic side view of the cargo bay floor segment and rails of FIG. 11B with the wheels in a fixed arrangement.

While FIGS. 8A, 8B, and 10A-F illustrate the cargo bay floor segment 502 as being only coupled with the rails 174 via the interface channel 520 that is designed to distribute the weight of the cargo bay floor segment 502 and cargo thereon to the rails 174, additional or alternative arrangements are considered. For example, FIGS. 11A-11D are illustrations of an example translation embodiment of a removable cargo bay floor segment that includes a plurality of wheels 540 in addition to an interface channel 520. FIGS. 11A and 11B show a cargo bay floor segment 502 can be disposed on a rail 174 and configured to translate along the rail 174 using a plurality of wheels 540, as indicated by allow 590. The cargo bay floor segment 502 includes interface channels 520 that are spaced apart from the rail 174. Accordingly, FIGS. 11A and 11B illustrate a first, or "translating," arrangement of an example cargo bay floor segment 502, whereby a series of wheels 540 (e.g., translation mechanisms) facilitates the advancement of the cargo bay floor segment 502 along the rails 174. The cargo bay floor segment 502 also includes a wheel displacement mechanism 541 configured to raise and lower the wheels 540 with respect to the cargo bay floor segment 502, thereby raising a lowering the cargo bay floor segment 502 with respect to the rails 174, as illustrated by distances 580 and 581 of FIGS. 11B and 11C, respectively, with 580 being larger than 581.

Figure 11D:
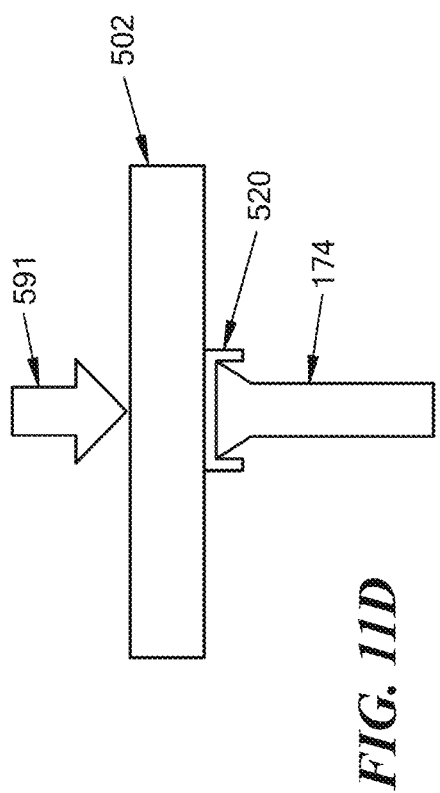
FIG. 11D is the schematic cross-sectional view of the cargo bay floor segment and one rail taken along line A-A of FIG. 11C.

Accordingly, and as shown in FIG. 11C, once the cargo bay floor segment 502 is in place, the wheel displacement mechanism 541 can retract the wheels 540 into the cargo bay floor segment 502 until the interface channels 520 are directly coupled with the rails 174, in a second, or "fixed," arrangement. In this second arrangement, the interface channels 520 distribute the weight of the cargo bay floor segment 502 and the cargo thereon (as indicated by arrows 591) to the rails 174. In FIG. 11C, the cargo bay floor segment 502 is in condition for being subsequently secured to the rail 174 via a locking element or the like. FIG. 11D is a cross-section view of line A-A of FIG. 11C, showing the interface channel 520 in contact with the top of the rail 174.

Figure 12:
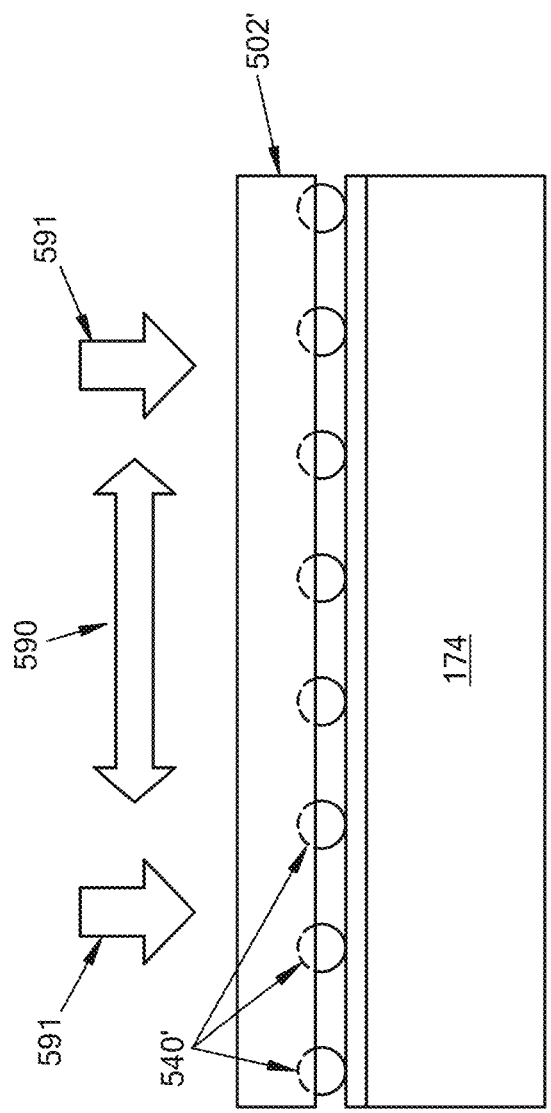
FIG. 12 is schematic side view of another embodiment of a removable cargo bay floor segment having wheels and being configured to translate with respect to the rail of the cargo aircraft of FIG. 6A.

FIG. 12 is an illustration of another example translation arrangement of a removable cargo bay floor segment 520' that is only coupled with the rail 174 via a plurality of fixed wheels 540' that are configured to both enable translation 590 of the cargo bay floor segment 502 along the rail 174 and also sufficiently distribute the weight of the cargo bay floor segment 502 and the cargo thereon 591 along the rail 174. While the embodiment of FIGS. 11A-D has the advantage of distributing the weight to the rail 174 with a simple direct engagement (e.g., via the interface channel 520), the embodiment of FIG. 12 has the advantage of having fixed wheels 540' that avoid the complication of a mechanism to raise and lower the wheels with respect to the cargo bay floor segment 502.

Figure 13B:
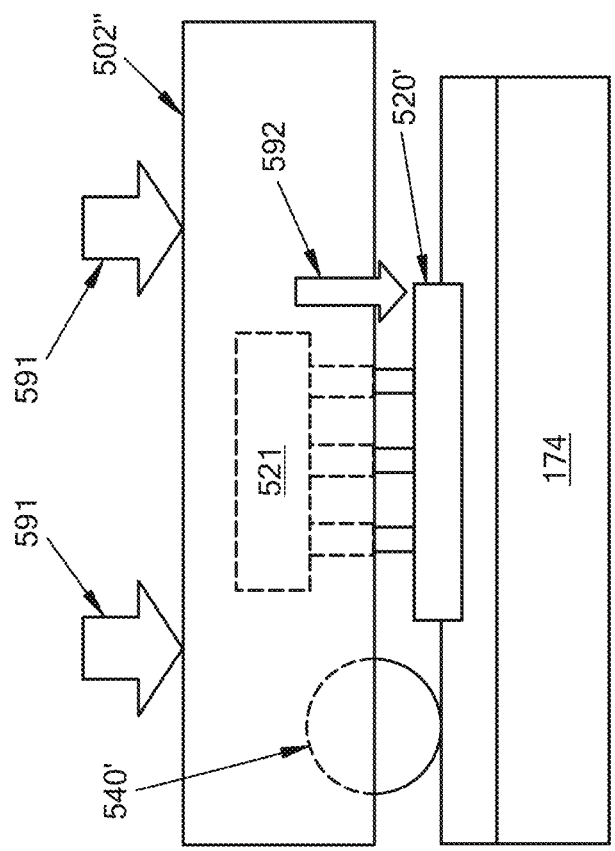
FIG. 13B is the schematic side view of the removable cargo bay floor segment and rail of FIG. 13A, the removable cargo bay floor segment being in a fixed arrangement.
Figure 13A:
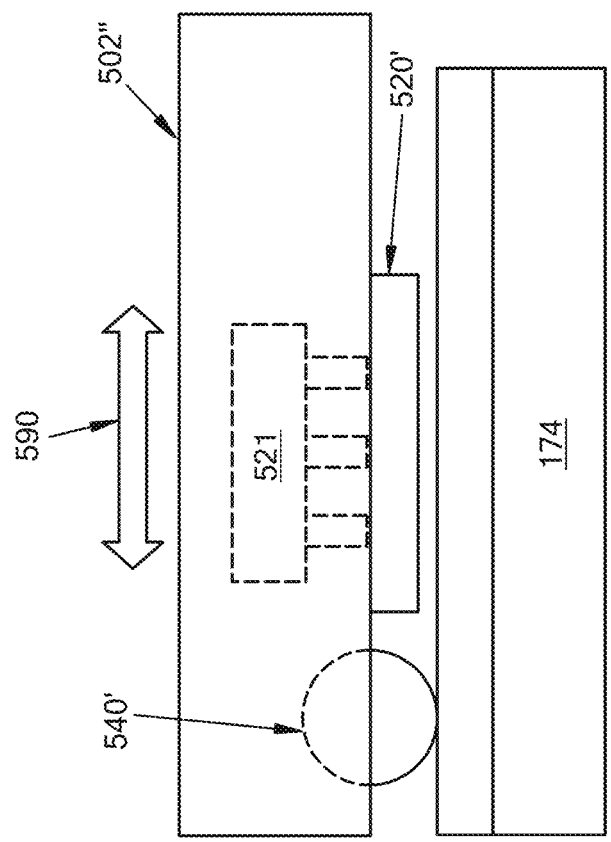
FIG. 13A is a schematic side view of still another embodiment of a removable cargo bay floor segment in a translation arrangement with respect to the rail of the cargo aircraft of FIG. 6A

FIGS. 13A and 13B are illustrations of a hybrid translation embodiment of a removable cargo bay floor segment 502" that uses fixed wheels 540' and a moveable interface channel 520'. FIG. 13A shows the hybrid cargo bay floor segment 502" in a first arrangement, with the fixed wheels 540' engaged with the rail 174, enabling translation 590 of the hybrid cargo bay floor segment 502" along the rail 174. In this arrangement, the moveable interface channel 520' is spaced apart from the rail 174 and is subsequently advanced (as indicated by arrow 592), via a linear actuator 521 towards the rail 174 until the moveable interface channel 520' is directly engaged with the rail 174 in a second arrangement, as shown in FIG. 13B. In the second arrangement of FIG. 13B, the moveable interface channel 520' is positioned to distribute some or all of the weight 591 of the hybrid cargo bay floor segment 502" and any cargo thereon along the rail 174. Both the linear actuator 521 and the wheel displacement mechanism 541 are examples of transformation mechanisms that move the cargo bay floor segments 502 between the first and second arrangements.

Other embodiments include wheels disposed on the rail 174 that are fixed in place and enable the translation movement of the cargo bay floor segments 502 into the cargo bay 170. Alternatively, one or more additional rails could be disposed along the cargo bay 170 for the purpose of enabling the movement of the cargo bay floor segments 502. In other examples, the cargo bay 170 can include an overhead crane system that can pick-up and move each cargo bay floor segment 502 into the cargo bay 170 and lower it into a desired final position along the rail 174. In some instances, a bay floor segment 502 can be first partially coupled with the rail (e.g., having a first set of wheels attached on a first end of the bay floor segment 502) at the terminal end of the rails 174 (e.g., with the nose cone door 126 open) and then the bay floor segment 502 can be advanced further into the cargo bay 170 along the rails 174 until it is fully attached (e.g., all of the wheels are riding along or otherwise coupled with the rail(s) 174). Another non-limiting example includes an intermediary trolley that travels along the rails 174 and carries each cargo bay floor segment 502 into position.

As mentioned above, the cargo bay floor segments 502 can have a variety of different shapes and sizes, including different thickness and structural arrangements. The cargo bay floor segments 502 shown here are single-piece units that both interface with the rails 174 and provide an upper cargo floor surface, however other configurations are within the scope of this disclosure. For example, cargo bay floor segments that interface with the rails and extend structural elements laterally that can be configured to receive and support floor panels therebetween. Such an arrangement may be useful, for example, for saving weight or can be disposed between cargo bay floor segments 520s supporting payload weights in order to provide a walkway.

Pre-Loading Cargo Using Cargo Floor Segments

Figure 14A:
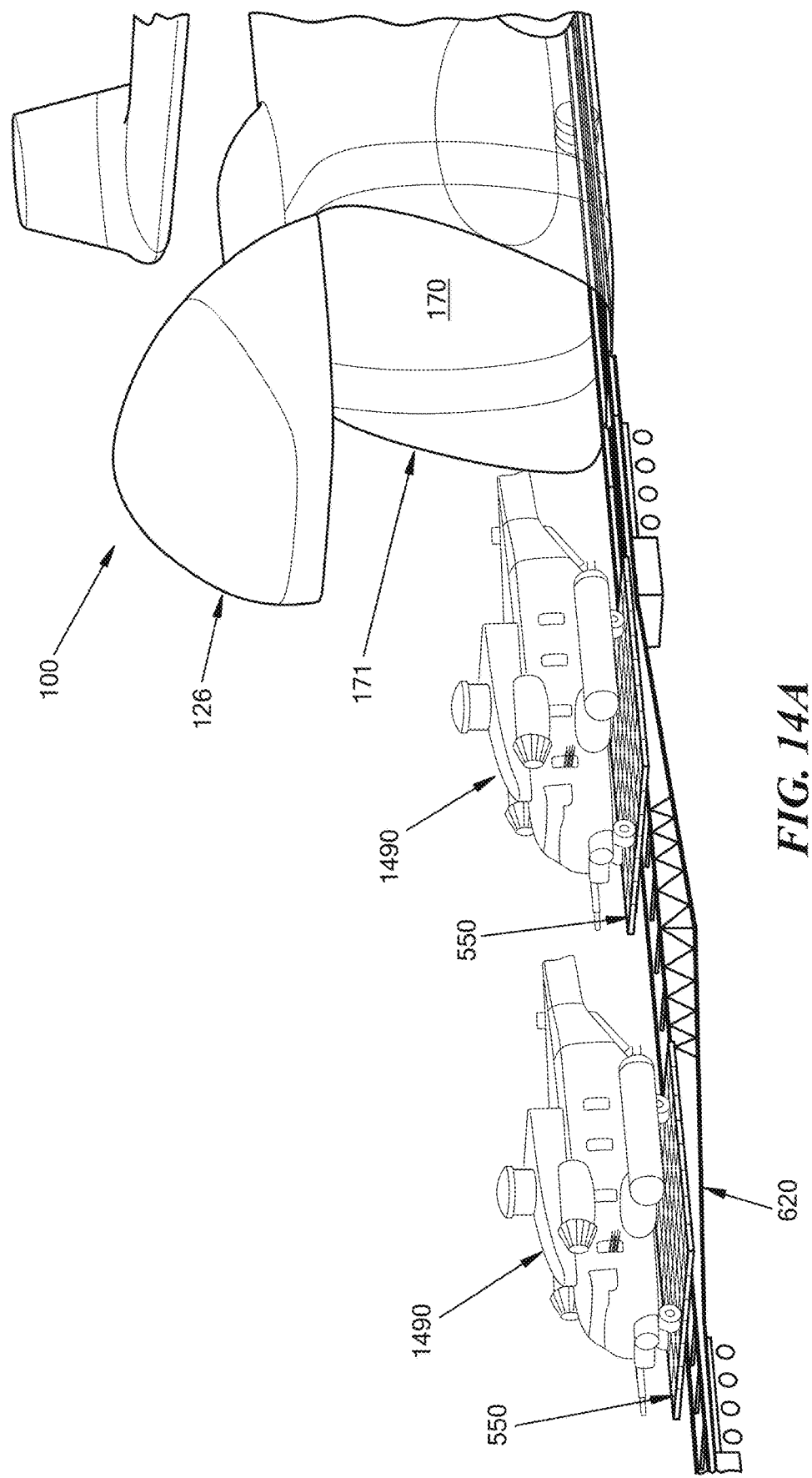
FIG. 14A is an isometric, partial translucent view of one embodiment of ground-based cargo loading using removable cargo bay floor segments in conjunction with the aircraft of FIG. 6A, the removable cargo bay floor segments having cargo coupled thereto.
Figure 14B:
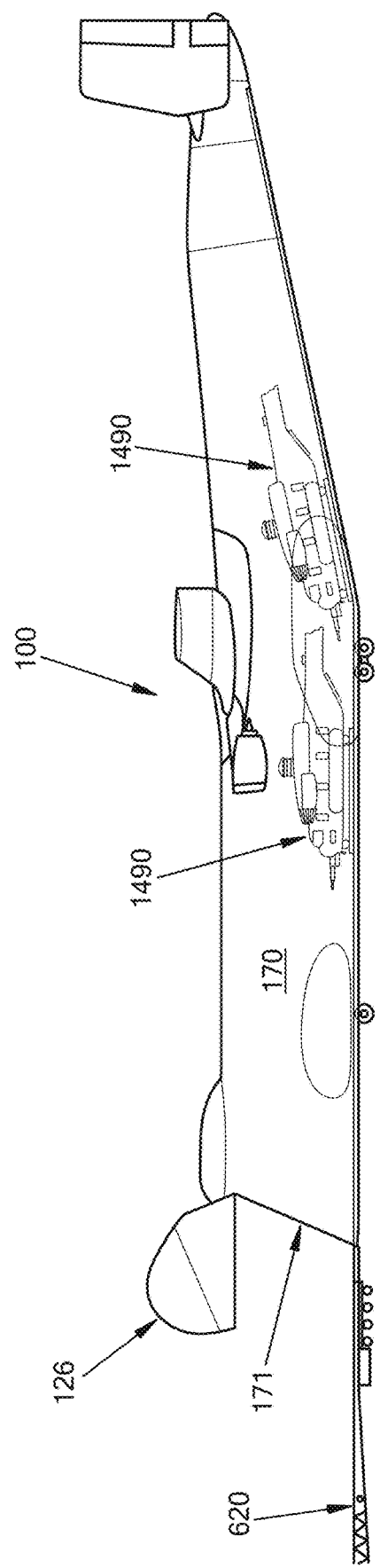
FIG. 14B is a partial translucent side view of the ground-based cargo loading of FIG. 14A with the removable cargo bay floor segments and cargo loaded into the cargo bay of the aircraft.

Moveable cargo bay floor assemblies 550 are also contemplated, for example, for use in ferrying larger payloads into the cargo bay 170. For example, FIG. 14A is an illustration of ground-based cargo loading of large helicopters using removable cargo bay floor segments. In FIG. 14A, two large helicopters are each disposed on a moveable cargo bay floor assembly 550, which itself can be constructed from one or more cargo bay floor segments 520 or be an entire individual floor segment. The moveable cargo bay floor assemblies 550 can be loaded with cargo on the ground-based cargo loading system 620 and subsequently be moved into the cargo bay 170 with the cargo, as shown in FIG. 14B. This enables the large payload 1490 to be carefully arranged on the moveable cargo bay floor assembly 550 with the ultimate position of the moveable cargo bay floor assembly 550 in the cargo bay 170 being predetermined, thereby drastically speeding up the cargo loading process, as once the moveable cargo bay floor assembly 550 is disposed in the desired location in the cargo bay 170, securing the moveable cargo bay floor assembly 550 to the rail 174 and/or other aircraft structure may be the final step in securing the cargo 1490 for flight.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. All publications and references cited herein are expressly incorporated herein by reference in their entirety.

Examples of the above-described embodiments can include the following:

1. A removable cargo bay floor system for a cargo aircraft, comprising:
   at least one rail disposed in an interior cargo bay of a cargo aircraft, the interior cargo bay having a forward bay portion located in a forward end of the cargo aircraft, an aft bay portion located in an aft end of the cargo aircraft, and the at least one rail extending longitudinally along a length of the forward bay portion and a length of the aft bay portion; and
   at least one cargo floor segment configured to be removably attached to the at least one rail, and, when attached to the at least one rail, the at least one cargo floor segment is transformable between a first arrangement in which the at least one cargo floor segment is translatable along a length of the at least one rail, and a second arrangement in which the at least one cargo floor segment is fixedly secured with respect to a location along the length of the at least one rail,
   wherein the at least one cargo floor segment is configured to, when fixedly secured with respect to a location along the length of the at least one rail, define a section of a floor of the cargo bay of the cargo aircraft.

2. The system of claim 1, wherein the at least one cargo floor segment comprises a plurality of cargo floor segments, each segment of the plurality of cargo floor segments configured to be removably attached to the at least one rail, adjacent to another cargo floor segment of the plurality of cargo floor segments, and fixedly secured with respect to a location along the length of the at least one rail in adjacent locations to define a continuous section of the floor of the cargo bay.

3. The system of claim 2, wherein each of the plurality of cargo floor segments is configured to be attached to the adjacent cargo floor segment of the plurality of cargo floor segments.

4. The system of any of claims 1 to 3, wherein the at least one cargo floor segment comprises:
   an interface region spanning along at least a portion of a length of the at least one cargo floor segment, the interface region being configured to contact the at least one rail in the second arrangement; and
   a translator configured to contact the at least one rail in the first arrangement and enable translation of the at least one cargo floor segment along the at least one rail.

5. The system of claim 4, wherein the translator comprises one or more wheels.

6. The system of claim 4 or 5, wherein the translator is configured to removably attach the at least one cargo floor segment to the at least one rail.

7. The system of any of claims 4 to 6, wherein the interface region of the at least one cargo floor segment, in the first arrangement, is spaced apart from the at least one rail.

8. The system of any of claims 4 to 7, further comprising a transition mechanism configured to switch the at least one cargo floor segment between the first arrangement and the second arrangement.

9. The system of claim 8, wherein the transition mechanism is configured to raise and lower the interface region with respect to the at least one rail.

10. The system of claim 9, wherein the transition mechanism is configured to raise and lower the interface region by raising and lowering the at least one cargo floor segment.

11. The system of claim 10, wherein the transition mechanism and the translator are operatively coupled together such that the transition mechanism raises and lowers the at least one cargo floor segment by applying a force to the at least one rail via the translator.

12. The system of any of claims 1 to 10, wherein the at least one cargo floor segment comprises a fixation mechanism configured to fixedly secure the at least one cargo floor segment with respect to the location along the length of the at least one rail by creating a geometric interference between the at least one cargo floor segment and at least one of the at least one rail or other structural element of the cargo aircraft, the geometric interference being configured to prevent movement of the at least one cargo floor segment with respect to the at least one rail.

13. The system of claim 12, wherein the fixation mechanism comprises a locking body configured to pass through an opening associated with the at least one rail or the other structural element of the cargo aircraft to create the geometric interference.

14. The system of any of claims 1 to 13, wherein the at least one rail comprises a first rail and a second rail extending substantially parallel to each other along a length of the cargo bay that includes the length of the forward bay portion and the length of the aft bay portion.

15. The system of any of claims 1 to 14, wherein the at least one cargo floor segment comprises a fixed region and at least one lateral end segment rotatably coupled to the fixed region.

16. The system of any of claims 1 to 15,
   wherein at least one cargo floor segment is configured to be securely fixed at one or more predetermined locations along the at least one rail, and
   wherein the at least one cargo floor segment defines lateral ends sized and shaped to correspond to an inner surface of the cargo bay at the one or more predetermined locations.

17. The system of any of claims 1 to 16, further comprising:
a cargo nose door configured to open a portion of the forward end of the cargo aircraft such that a terminal end of the at least one rail disposed in the forward bay portion is accessible from an outside environment when the cargo nose door is open,
wherein the at least one cargo floor segment is configured to be at least partially attached to the terminal end of the at least one rail when the cargo nose door is open and loaded into the cargo bay such that, after being loaded, the at least one cargo floor segment is completely attached to the at least one rail.

18. The system of any of claims 1 to 17, wherein the at least one cargo floor segment is configured to support cargo weight and direct at least a majority of the cargo weight supported by the at least one cargo floor segment into the at least one rail.

19. The system of claim 18, wherein the at least one cargo floor segment comprises one or more lateral support beams configured to direct payload loads at lateral ends of the at least one cargo floor segment to the at least one rail via a medially located interface region configured to contact the at least one rail in the second arrangement.

20. The system of any of claims 1 to 19, the cargo aircraft comprising a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft,
wherein the at least one rail extends from the forward bay portion, through the kinked bay portion, and into the aft bay portion.

21. The system of claim 20, wherein the at least one cargo floor segment comprises a plurality of cargo floor segments, each segment of the plurality of cargo floor segments configured to be removably attached to the at least one rail, adjacent to another cargo floor segment of the plurality of cargo floor segments, and fixedly secured with respect to a location along a length of the at least one rail in adjacent locations to define a continuous section of the floor of the cargo bay that extends from the forward bay portion, through the kinked bay portion, and into the aft bay portion, and
wherein the continuous section of the floor defines an aft region in the aft bay portion that extends above a forward region in the forward bay portion.

22. The system of claim 20 or 2120, wherein at least one rail of the one or more rails includes a kinked portion such that a vertical distance between at least a portion of the at least one rail aft of the kinked portion and the plane defined by an interior bottom contact surface of the forward bay portion is greater than a vertical distance between at least a portion of the at least one rail forward of the kinked portion and the plane defined by the interior bottom contact surface of the forward bay portion.

23. The system of claim 22, wherein the kinked portion of at least one rail of the one or more rails is disposed in the aft bay portion such that a majority of the kinked portion forms an angle with a portion of the at least one rail disposed in the forward bay portion that is substantially parallel to the longitudinal-lateral plane of the cargo aircraft.

24. The system of claim 23, wherein at least one rail of the one or more rails extends continuously along an interior bottom contact surface of the cargo bay from the forward bay portion to the aft bay portion.

25. The system of claim 24, wherein at least one rail of the one or more rails further serves as a primary structural beam of the cargo aircraft.

26. The system of claim 25, wherein the at least one rail comprises at least two rails disposed approximately parallel to each other.

27. The system of any of claims 1 to 26, further comprising a ground-based cargo loading structure including at least one rail having a terminal end configured to be positioned adjacent to a terminal end of the at least one rail in the cargo bay of the aircraft when the terminal end of the at least one rail is exposed via the opening of a cargo bay door, and wherein, the at least one cargo floor segment is configured to be translated between the cargo aircraft and the ground-based cargo loading structure via the at least one rails when the terminal ends of the at least one rails of the cargo load structure and of the cargo aircraft are positioned adjacent to each other.

28. The system of claim 27, wherein the at least one cargo floor segment is configured to be loaded with at least a portion of a payload while attached to the at least one rail of the ground-based cargo loading structure and subsequently assist in the loading of the payload into the cargo bay by being translated along the at least one rails from ground-based cargo loading structure and into the cargo bay.

29. The system of any of claims 1 to 28, wherein the at least one cargo floor segment comprises one or more fixtures configured to secure at least a portion of a payload to the at least one cargo floor segment.

30. A method of loading a cargo floor onto a cargo aircraft, comprising:
removably attaching at least one cargo floor segment to one or more rails disposed in an interior cargo bay of a cargo aircraft, the interior cargo bay having a forward bay portion located in a forward end of the cargo aircraft, an aft bay portion located in an aft end of the cargo aircraft, and the one or more rails extending longitudinally along a length of the forward bay portion and a length of the aft bay portion;
translating the at least one cargo floor segment along the one or more rails through at least a portion of the interior cargo bay to a desired location along a length of the one or more rails; and
fixedly securing the at least one cargo floor segment at the desired location to define a section of a cargo floor of the cargo bay of the cargo aircraft.

31. The method of claim 30, wherein the at least one cargo floor segment comprises a plurality of cargo floor segments, the method further comprising:
sequentially attaching the plurality of cargo floor segments to the one or more rails,
translating each cargo floor segment of the plurality of cargo floor segments to respective desired locations, each desired location being corresponding adjacent locations to each other; and
fixedly securing each cargo floor segment of the plurality of cargo floor segments at the respective desired locations to define a continuous section of the cargo floor of the cargo bay.

32. The method of claim 31, further comprising attaching each cargo floor segment of the plurality of cargo floor segments to an adjacent cargo floor segment of the plurality of cargo floor segments.

33. The method of any of claims 30 to 32, wherein fixedly securing the at least one cargo floor segment further comprises contacting the one or more rails with an interface region of the at least one cargo floor segment, the interface region spanning along at least a portion of a length of the at least one cargo floor segment.

34. The method of claim 33, wherein the interface region is spaced apart from the one or more rails when translating the at least one cargo floor segment along the one or more rails.

35. The method of any of claims 30 to 34, wherein removably attaching at least one cargo floor segment to one or more rails comprises coupling a translator of the at least one cargo floor segment to the one or more rails, the translator enabling the at least one cargo floor segment to be advanced along the one or more rails.

36. The method of claim 33, wherein fixedly securing the at least one cargo floor segment further comprises at least one of raising or lowering the interface region with respect to the one or more rails.

37. The method of claim 36, wherein a transition mechanism of at least one cargo floor segment switches the at least one cargo floor segment between a first arrangement in which the at least one cargo floor segment can be advanced along the one or more rails and a second arrangement in which movement of the at least one cargo floor segment along the one or more rails is resisted by the interface region.

38. The method of claim 37,
wherein the transition mechanism and the translator are operatively coupled together, and
wherein fixedly securing the at least one cargo floor segment at the desired location further comprises applying a force to the one or more rails via the translator.

39. The method of any of claims 30 to 38, wherein fixedly securing the at least one cargo floor segment further comprises creating a geometric interference between the at least one cargo floor segment and at least one of the one or more rails or other structural element of the cargo aircraft.

40. The method of claim 39, wherein creating the geometric interference comprises disposing a locking body coupled to the at least one cargo floor segment through an opening associated with the one or more rails or the other structural element of the cargo aircraft.

41. The method of any of claims 30 to 40, wherein removably attaching at least one cargo floor segment to one or more rails disposed in an interior cargo bay of a cargo aircraft comprises translating the at least one cargo floor segment from one or more rails of a ground-based cargo loading structure onto the one or more rails of the cargo aircraft when a terminal end of the one or more rails of the ground support structure is adjacent to a terminal end of the one or more rails of the cargo aircraft.

42. The method of claim 41, wherein a payload to be loaded onto the cargo aircraft is securely fixed to the at least one cargo floor segment before the at least one cargo floor segment is advanced from the ground-based cargo loading structure into the cargo bay of the cargo aircraft.

43. The method of claim 42, further comprising, after the payload and the at least one cargo floor segment is loaded into the cargo bay, securing the payload at the location in the cargo bay by fixedly securing the at least one cargo floor segment at the desired location.

44. The method of any of claims 30 to 43, further comprising rotating one or more lateral end segments of the at least one cargo floor segment with respect to a fixed region of the at least one cargo floor segment.

45. The method of any of claims 30 to 44, wherein at least one rail of the one or more rails includes a kinked portion such that a vertical distance between at least a portion of the at least one rail aft of the kinked portion and the plane defined by an interior bottom contact surface of the forward bay portion is greater than a vertical distance between at least a portion of the at least one rail forward of the kinked portion and the plane defined by the interior bottom contact surface of the forward bay portion.

46. The method of claim 45, wherein the kinked portion of at least one rail of the one or more rails is disposed in the aft bay portion such that a majority of the kinked portion forms an angle with a portion of the at least one rail disposed in the forward bay portion that is substantially parallel to the longitudinal-lateral plane of the cargo aircraft.

47. The method of claim 46, wherein at least one rail of the one or more rails extends continuously along an interior bottom contact surface of the cargo bay from the forward bay portion to the aft bay portion.

48. The method of claim 47, wherein at least one rail of the one or more rails further serves as a primary structural beam of the cargo aircraft.

49. The method of claim 48, wherein the at least one rail comprises at least two rails disposed approximately parallel to each other.

What is claimed is:

1. A removable cargo bay floor system for a cargo aircraft, comprising:
   at least one rail disposed in an interior cargo bay of a cargo aircraft, the interior cargo bay having a forward bay portion located in a forward end of the cargo aircraft, an aft bay portion located in an aft end of the cargo aircraft, and the at least one rail extending longitudinally along a length of the forward bay portion and a length of the aft bay portion; and
   at least one cargo floor segment configured to be removably attached to the at least one rail, and, when attached to the at least one rail, the at least one cargo floor segment is transformable between a first arrangement in which the at least one cargo floor segment is translatable along a length of the at least one rail, and a second arrangement in which the at least one cargo floor segment is fixedly secured with respect to a location along the length of the at least one rail,
   wherein the at least one cargo floor segment is configured to, when fixedly secured with respect to a location along the length of the at least one rail, define a section of a floor of the cargo bay of the cargo aircraft, and
   wherein the at least one cargo floor segment comprises:
   an interface region spanning along at least a portion of a length of the at least one cargo floor segment, the interface region being configured to contact the at least one rail in the second arrangement; and
   a translator configured to contact the at least one rail in the first arrangement and enable translation of the at least one cargo floor segment along the at least one rail.

2. The system of claim 1, wherein the at least one cargo floor segment comprises a plurality of cargo floor segments, each segment of the plurality of cargo floor segments configured to be removably attached to the at least one rail, adjacent to another cargo floor segment of the plurality of cargo floor segments, and fixedly secured with respect to a location along the length of the at least one rail in adjacent locations to define a continuous section of the floor of the cargo bay.

3. The system of claim 2, wherein each of the plurality of cargo floor segments is configured to be attached to the adjacent cargo floor segment of the plurality of cargo floor segments.

4. The system of claim 1, wherein the translator comprises one or more wheels.

5. The system of claim 1, wherein the translator is configured to removably attach the at least one cargo floor segment to the at least one rail.

6. The system of claim 1, wherein the interface region of the at least one cargo floor segment, in the first arrangement, is spaced apart from the at least one rail.

7. The system of claim 6, further comprising a transition mechanism configured to switch the at least one cargo floor segment between the first arrangement and the second arrangement.

8. The system of claim 7, wherein the transition mechanism is configured to raise and lower the interface region with respect to the at least one rail.

9. The system of claim 8, wherein the transition mechanism is configured to raise and lower the interface region by raising and lowering the at least one cargo floor segment.

10. The system of claim 1, wherein the at least one cargo floor segment comprises a fixation mechanism configured to fixedly secure the at least one cargo floor segment with respect to the location along the length of the at least one rail by creating a geometric interference between the at least one cargo floor segment and at least one of the at least one rail or other structural element of the cargo aircraft, the geometric interference being configured to prevent movement of the at least one cargo floor segment with respect to the at least one rail.

11. The system of claim 10, wherein the fixation mechanism comprises a locking body configured to pass through an opening associated with the at least one rail or the other structural element of the cargo aircraft to create the geometric interference.

12. The system of claim 1, wherein the at least one cargo floor segment comprises a fixed region and at least one lateral end segment rotatably coupled to the fixed region.

13. The system of claim 1, wherein at least one cargo floor segment is configured to be securely fixed at one or more predetermined locations along the at least one rail, and wherein the at least one cargo floor segment defines lateral ends sized and shaped to correspond to an inner surface of the cargo bay at the one or more predetermined locations.

14. The system of claim 1, wherein the at least one cargo floor segment is configured to support cargo weight and direct at least a majority of the cargo weight supported by the at least one cargo floor segment into the at least one rail.

15. The system of claim 14, wherein the at least one cargo floor segment comprises one or more lateral support beams configured to direct payload loads at lateral ends of the at least one cargo floor segment to the at least one rail via a medially located interface region configured to contact the at least one rail in the second arrangement.

16. The system of claim 1, the cargo aircraft comprising a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, wherein the at least one rail extends from the forward bay portion, through the kinked bay portion, and into the aft bay portion.

17. The system of claim 16, wherein the at least one cargo floor segment comprises a plurality of cargo floor segments, each segment of the plurality of cargo floor segments configured to be removably attached to the at least one rail, adjacent to another cargo floor segment of the plurality of cargo floor segments, and fixedly secured with respect to a location along a length of the at least one rail in adjacent locations to define a continuous section of the floor of the cargo bay that extends from the forward bay portion, through the kinked bay portion, and into the aft bay portion, and wherein the continuous section of the floor defines an aft region in the aft bay portion that extends above a forward region in the forward bay portion.

18. The system of claim 1, further comprising a ground-based cargo loading structure including at least one rail having a terminal end configured to be positioned adjacent to a terminal end of the at least one rail in the cargo bay of the aircraft when the terminal end of the at least one rail is exposed via the opening of a cargo bay door, and wherein, the at least one cargo floor segment is configured to be translated between the cargo aircraft and the ground-based cargo loading structure via the at least one rails when the terminal ends of the at least one rails of the cargo load structure and of the cargo aircraft are positioned adjacent to each other.

19. The system of claim 18, wherein the at least one cargo floor segment is configured to be loaded with at least a portion of a payload while attached to the at least one rail of the ground-based cargo loading structure and subsequently assist in the loading of the payload into the cargo bay by being translated along the at least one rails from ground-based cargo loading structure and into the cargo bay.

20. The system of claim 1, wherein the at least one cargo floor segment comprises one or more fixtures configured to secure at least a portion of a payload to the at least one cargo floor segment.

21. A method of loading a cargo floor onto a cargo aircraft, comprising:
removably attaching at least one cargo floor segment to one or more rails disposed in an interior cargo bay of a cargo aircraft, the interior cargo bay having a forward bay portion located in a forward end of the cargo aircraft, an aft bay portion located in an aft end of the cargo aircraft, and the one or more rails extending longitudinally along a length of the forward bay portion and a length of the aft bay portion;
translating the at least one cargo floor segment along the one or more rails through at least a portion of the interior cargo bay to a desired location along a length of the one or more rails; and
fixedly securing the at least one cargo floor segment at the desired location to define a section of a cargo floor of the cargo bay of the cargo aircraft, wherein fixedly securing the at least one cargo floor segment further comprises contacting the one or more rails with an interface region of the at least one cargo floor segment, the interface region spanning along at least a portion of a length of the at least one cargo floor segment.

22. The method of claim 21, wherein the at least one cargo floor segment comprises a plurality of cargo floor segments, the method further comprising:
sequentially attaching the plurality of cargo floor segments to the one or more rails,
translating each cargo floor segment of the plurality of cargo floor segments to respective desired locations, each desired location being corresponding adjacent locations to each other; and
fixedly securing each cargo floor segment of the plurality of cargo floor segments at the respective desired locations to define a continuous section of the cargo floor of the cargo bay.

23. The method of claim 21, wherein removably attaching at least one cargo floor segment to one or more rails comprises coupling a translator of the at least one cargo floor segment to the one or more rails, the translator enabling the at least one cargo floor segment to be advanced along the one or more rails.

24. The method of claim 21, wherein fixedly securing the at least one cargo floor segment further comprises at least one of raising or lowering the interface region with respect to the one or more rails.

25. The method of claim 21, wherein fixedly securing the at least one cargo floor segment further comprises creating a geometric interference between the at least one cargo floor segment and at least one of the one or more rails or other structural element of the cargo aircraft.

26. The method of claim 21, wherein removably attaching at least one cargo floor segment to one or more rails disposed in an interior cargo bay of a cargo aircraft comprises translating the at least one cargo floor segment from one or more rails of a ground-based cargo loading structure onto the one or more rails of the cargo aircraft when a terminal end of the one or more rails of the ground support structure is adjacent to a terminal end of the one or more rails of the cargo aircraft.

27. The method of claim 21, further comprising rotating one or more lateral end segments of the at least one cargo floor segment with respect to a fixed region of the at least one cargo floor segment.

28. The method of claim 21, wherein one or more rails of the one or more rails includes a kinked portion such that a vertical distance between at least a portion of the one or more rails aft of the kinked portion and the plane defined by an interior bottom contact surface of the forward bay portion is greater than a vertical distance between at least a portion of the one or more rails forward of the kinked portion and the plane defined by the interior bottom contact surface of the forward bay portion.

29. A method of loading a cargo floor onto a cargo aircraft, comprising:
removably attaching at least one cargo floor segment to one or more rails disposed in an interior cargo bay of a cargo aircraft, the interior cargo bay having a forward bay portion located in a forward end of the cargo aircraft, an aft bay portion located in an aft end of the cargo aircraft, and the one or more rails extending longitudinally along a length of the forward bay portion and a length of the aft bay portion;
translating the at least one cargo floor segment along the one or more rails through at least a portion of the interior cargo bay to a desired location along a length of the one or more rails; and
fixedly securing the at least one cargo floor segment at the desired location to define a section of a cargo floor of the cargo bay of the cargo aircraft,
wherein one or more rails of the one or more rails includes a kinked portion such that a vertical distance between at least a portion of the one or more rails aft of the kinked portion and the plane defined by an interior bottom contact surface of the forward bay portion is greater than a vertical distance between at least a portion of the one or more rails forward of the kinked portion and the plane defined by the interior bottom contact surface of the forward bay portion.

30. The method of claim 29, wherein the at least one cargo floor segment comprises a plurality of cargo floor segments, the method further comprising:
sequentially attaching the plurality of cargo floor segments to the one or more rails,
translating each cargo floor segment of the plurality of cargo floor segments to respective desired locations, each desired location being corresponding adjacent locations to each other; and
fixedly securing each cargo floor segment of the plurality of cargo floor segments at the respective desired locations to define a continuous section of the cargo floor of the cargo bay.

31. The method of claim 29, wherein removably attaching at least one cargo floor segment to one or more rails comprises coupling a translator of the at least one cargo floor segment to the one or more rails, the translator enabling the at least one cargo floor segment to be advanced along the one or more rails.

32. A removable cargo bay floor system for a cargo aircraft, comprising:
at least one rail disposed in an interior cargo bay of a cargo aircraft, the interior cargo bay having a forward bay portion located in a forward end of the cargo aircraft, an aft bay portion located in an aft end of the cargo aircraft, and the at least one rail extending longitudinally along a length of the forward bay portion and a length of the aft bay portion; and
at least one cargo floor segment configured to be removably attached to the at least one rail, and, when attached to the at least one rail, the at least one cargo floor segment is transformable between a first arrangement in which the at least one cargo floor segment is translatable along a length of the at least one rail, and a second arrangement in which the at least one cargo floor segment is fixedly secured with respect to a location along the length of the at least one rail,
wherein the at least one cargo floor segment is configured to, when fixedly secured with respect to a location along the length of the at least one rail, define a section of a floor of the cargo bay of the cargo aircraft,
wherein the at least one cargo floor segment is configured to support cargo weight and direct at least a majority of the cargo weight supported by the at least one cargo floor segment into the at least one rail, and
wherein the at least one cargo floor segment comprises one or more lateral support beams configured to direct payload loads at lateral ends of the at least one cargo floor segment to the at least one rail via a medially located interface region configured to contact the at least one rail in the second arrangement.

33. The system of claim 32, wherein the at least one cargo floor segment comprises a fixation mechanism configured to fixedly secure the at least one cargo floor segment with respect to the location along the length of the at least one rail by creating a geometric interference between the at least one cargo floor segment and at least one of the at least one rail or other structural element of the cargo aircraft, the geometric interference being configured to prevent movement of the at least one cargo floor segment with respect to the at least one rail.

34. The system of claim 33, wherein the fixation mechanism comprises a locking body configured to pass through an opening associated with the at least one rail or the other structural element of the cargo aircraft to create the geometric interference.

35. The system of claim 32, wherein the at least one cargo floor segment comprises a fixed region and at least one lateral end segment rotatably coupled to the fixed region.

36. The system of claim 32,
wherein at least one cargo floor segment is configured to be securely fixed at one or more predetermined locations along the at least one rail, and wherein the at least one cargo floor segment defines lateral ends sized and shaped to correspond to an inner surface of the cargo bay at the one or more predetermined locations.

37. A removable cargo bay floor system for a cargo aircraft, comprising:
- at least one rail disposed in an interior cargo bay of a cargo aircraft, the interior cargo bay having a forward bay portion located in a forward end of the cargo aircraft, an aft bay portion located in an aft end of the cargo aircraft, and the at least one rail extending longitudinally along a length of the forward bay portion and a length of the aft bay portion; and
- at least one cargo floor segment configured to be removably attached to the at least one rail, and, when attached to the at least one rail, the at least one cargo floor segment is transformable between a first arrangement in which the at least one cargo floor segment is translatable along a length of the at least one rail, and a second arrangement in which the at least one cargo floor segment is fixedly secured with respect to a location along the length of the at least one rail,
- wherein the at least one cargo floor segment is configured to, when fixedly secured with respect to a location along the length of the at least one rail, define a section of a floor of the cargo bay of the cargo aircraft,
- wherein the cargo aircraft comprises a kinked bay portion disposed between the forward bay portion and the aft bay portion, the kinked bay portion defining a location at which the aft end of the cargo aircraft begins to raise relative to a longitudinal-lateral plane of the cargo aircraft such that an aft-most terminal end of the aft bay portion is disposed above the longitudinal-lateral plane of the cargo aircraft, and
- wherein the at least one rail extends from the forward bay portion, through the kinked bay portion, and into the aft bay portion.

38. The system of claim 37, wherein the at least one cargo floor segment comprises a plurality of cargo floor segments, each segment of the plurality of cargo floor segments configured to be removably attached to the at least one rail, adjacent to another cargo floor segment of the plurality of cargo floor segments, and fixedly secured with respect to a location along a length of the at least one rail in adjacent locations to define a continuous section of the floor of the cargo bay that extends from the forward bay portion, through the kinked bay portion, and into the aft bay portion, and
wherein the continuous section of the floor defines an aft region in the aft bay portion that extends above a forward region in the forward bay portion.

39. The system of claim 37, wherein the at least one cargo floor segment comprises a fixation mechanism configured to fixedly secure the at least one cargo floor segment with respect to the location along the length of the at least one rail by creating a geometric interference between the at least one cargo floor segment and at least one of the at least one rail or other structural element of the cargo aircraft, the geometric interference being configured to prevent movement of the at least one cargo floor segment with respect to the at least one rail.

40. The system of claim 39, wherein the fixation mechanism comprises a locking body configured to pass through an opening associated with the at least one rail or the other structural element of the cargo aircraft to create the geometric interference.

41. The system of claim 37, wherein the at least one cargo floor segment comprises a fixed region and at least one lateral end segment rotatably coupled to the fixed region.

42. The system of claim 37,
wherein at least one cargo floor segment is configured to be securely fixed at one or more predetermined locations along the at least one rail, and
wherein the at least one cargo floor segment defines lateral ends sized and shaped to correspond to an inner surface of the cargo bay at the one or more predetermined locations.

* * * * *